US012452085B2

(12) United States Patent
Mackay et al.

(10) Patent No.: US 12,452,085 B2
(45) Date of Patent: Oct. 21, 2025

(54) DIGITAL CONTRACTS USING BLOCKCHAIN TRANSACTIONS

(71) Applicant: nChain Holdings Limited, St. John's (AG)

(72) Inventors: Alexander Mackay, London (GB); Craig Wright, London (GB)

(73) Assignee: nChain Licensing AG, Zug (CH)

( * ) Notice: Subject to any disclaimer, the term of this patent is extended or adjusted under 35 U.S.C. 154(b) by 93 days.

(21) Appl. No.: 17/628,510

(22) PCT Filed: Jun. 25, 2020

(86) PCT No.: PCT/IB2020/055999

§ 371 (c)(1),
(2) Date: Jan. 19, 2022

(87) PCT Pub. No.: WO2021/014233

PCT Pub. Date: Jan. 28, 2021

(65) Prior Publication Data

US 2022/0278859 A1 Sep. 1, 2022

(30) Foreign Application Priority Data

Jul. 25, 2019 (GB) ..................................... 1910649

(51) Int. Cl.
*H04L 9/00* (2022.01)
*G06F 21/64* (2013.01)
(Continued)

(52) U.S. Cl.
CPC .............. *H04L 9/50* (2022.05); *G06F 21/645* (2013.01); *G06Q 20/02* (2013.01); *G06Q 20/382* (2013.01);
(Continued)

(58) Field of Classification Search
CPC ......... H04L 9/50; G06F 21/645; G06Q 20/02; G06Q 20/382; G06Q 20/401; G06Q 2220/00
See application file for complete search history.

(56) References Cited

U.S. PATENT DOCUMENTS

2005/0114666 A1* 5/2005 Sudia .................... H04L 9/3236 713/175
2019/0103973 A1 4/2019 Chalkias et al.

FOREIGN PATENT DOCUMENTS

CN 111737728 A * 10/2020
JP 2016509443 A 3/2016
(Continued)

OTHER PUBLICATIONS

"What is a Bitcoin Merklized Abstract Syntax Tree (MAST)?". Bitcoin Tech Talk, 2017, https://bitcointechtalk.com/what-is-a-bitcoin-merklized-abstract-syntax-tree-mast-33fdf2da5e2f. Accessed Oct. 18, 2018.
(Continued)

*Primary Examiner* — Neha Patel
*Assistant Examiner* — Davida Lee King
(74) *Attorney, Agent, or Firm* — Messner Reeves LLP

(57) ABSTRACT

A computer-implemented method of encoding a digital contract between first and second parties of a blockchain network, the digital contract being for transferring an amount of a digital asset from the first to the second party based on a condition being fulfilled; the method comprising: obtaining a plurality of data elements, each representing a different contract condition, wherein at least one of the conditions is linked to the second party; generating a hash tree based on the data elements, wherein the hash tree comprises: i) first leaf hashes generated by hashing a respective data element, and second leaf hashes comprising at least one hash key generated by hashing a secret value known
(Continued)

only to the trusted third party, ii) internal hashes, and iii) a root hash; and making the root hash available to the first party for inclusion in a transaction of the blockchain.

12 Claims, 10 Drawing Sheets

(51) Int. Cl.
*G06Q 20/02* (2012.01)
*G06Q 20/38* (2012.01)
*G06Q 20/40* (2012.01)

(52) U.S. Cl.
CPC ....... *G06Q 20/401* (2013.01); *G06Q 2220/00* (2013.01)

(56) References Cited

FOREIGN PATENT DOCUMENTS

| | | | | |
|---|---|---|---|---|
| JP | 6521421 B1 | | 5/2019 | |
| WO | WO-2019116248 A1 | * | 6/2019 | ......... G06F 16/2246 |

OTHER PUBLICATIONS

"Bitcoin/Bips". Github, 2016, https://github.com/bitcoin/bips/blob/master/bip-0114.mediawiki. Accessed Oct. 18, 2018.
Antonopoulos, A. M. (2014). Mastering Bitcoin: unlocking digital cryptocurrencies. O'Reilly Media, Inc.
International Search Report for PCT/IB2020/055999 dated Jan. 13, 2021.
Combined Search and Examination Report of United Kingdom Application No. GB1910649.1 dated Jan. 24, 2020.

* cited by examiner

Transaction from Alice to Bob

Validated by running: Alice's locking script (from output of $Tx_0$), together with Alice's unlocking script (as input to $Tx_1$). This checks that $Tx_1$ meets the condition(s) defined in Alice's locking script.

Figure 11

| TxID₃ ||||
|---|---|---|---|
| Version | 1 | Locktime | |
| In-count | 1 | Out-count | 2 |
| Input list || Output list ||
| Outpoint | Unlocking script | Value | Locking script |
| ... | \<Alice Sig> \<Alice Pubkey> | 1 | \<Merkle path length> OP_PICK OP_SHA256 (OP_SWAP OP_IF OP_SWAP OP_ENDIF OP_CAT OP_SHA256)*[Tree depth] \<R> OP_EQUALVERIFY [RABIN SIG CHECK]<br><br>OP_IF OP_DUP OP_HASH160 \<H(Bob Pubkey)> OP_EQUALVERIFY OP_CHECKSIG OP_ENDIF<br><br>OP_ELSE \<'1 Month'> OP_CHECKSEQUENCEVERIFY OP_DROP OP_DUP OP_HASH160 \<H(Alice Pubkey)> OP_EQUALVERIFY OP_CHECKSIG OP_ENDIF |
| | | 0 | |

| | | | |
|---|---|---|---|
| $TxID_4$ | | | |
| Version | 1 | Locktime | |
| In-count | 1 | Out-count | 1 |
| Input list | | Output list | |
| Outpoint | Unlocking script | Value | Locking script |
| $TxID_3$,0 | <Bob sig> <Bob Pubkey> <S> <U> <'Round 3'> <n (Carol)> [Merkle path] | 0.99 | <Spending outputs> |
| | | | |

DIGITAL CONTRACTS USING BLOCKCHAIN TRANSACTIONS

CROSS REFERENCE TO RELATED APPLICATIONS

This application is a U.S. National Stage of PCT Application No. PCT/162020/055999 filed on Jun. 25, 2020, which claims the benefit of United Kingdom Application No. 1910649.1, filed on Jul. 25, 2019, the entire contents of which are incorporated herein by reference.

TECHNICAL FIELD

The present disclosure relates to methods for enabling nodes of a blockchain network to agree on and enforce a digital contract, also referred to as a so-called "smart contract".

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

One of the largest growing applications of blockchain technology is digital (or smart) contracts. A smart contract is a computer implemented protocol that enable parties to agree on and enforce a digital contract in a way that is both secure and trustless.

SUMMARY

Some well-known blockchain ledgers make use of a stack-based scripting language for transactions. The current primitive nature of the scripting language and the limitations on script size is regarded as a barrier to the creation of blockchain-based platforms for smart contracts. An example of smart contracts that can be encoded using a scripting language is escrow smart contracts (condition-based spending protocols), where the right to redeem a transaction output is dependent on the outcome of an event. However, as the amount of script required to encode contracts of this kind scales linearly with the number of dependencies, the number of such dependencies that can be contained in a transaction is frustratingly low.

According to one aspect disclosed herein, there is provided a computer-implemented method of encoding a digital contract between a first party of a blockchain network and a second party of the blockchain network, the digital contract being for transferring an amount of a digital asset from the first party to the second party based on a condition of the contract being fulfilled; the method being performed by a trusted third party and comprising: obtaining a plurality of data elements, each data element representing a different condition of the contract, and wherein at least one of the different conditions is linked to the second party; generating a hash tree based on the plurality of data elements, wherein the hash tree comprises: i) a leaf layer comprising a first set of leaf hashes each generated by hashing a respective data element, and a second set of leaf hashes comprising at least one hash key generated by hashing a secret value known only to the trusted third party; and ii) one or more internal layers each comprising a respective set of internal hashes, wherein each internal hash of a respective internal layer is generated by hashing a concatenation of at least two hashes from a lower layer; and iii) a root layer comprising a root hash, the root hash generated by hashing a concatenation of at least two hashes from an uppermost internal layer; and making the root hash available to the first party for inclusion in a transaction of the blockchain.

According to another aspect disclosed herein, there is provided a computer-implemented method of generating a digital contract between a first party of a blockchain network and a second party of the blockchain network, the digital contract being for transferring an amount of a digital asset from the first party to the second node based on a condition of the contract being fulfilled; the method being performed by the first party and comprising: obtaining a root hash of a hash tree generated by a trusted third party, the hash tree being generated based on i) a plurality of data elements, each data element representing a different condition of the contract, and wherein at least one of the different conditions is linked to the second party, and ii) one or more different hash keys generated based on a secret value known only to the trusted party; and generating a transaction for inclusion in the blockchain, wherein the transaction comprises a locking script for locking the amount of the digital asset to the first party, and wherein the locking script comprises the root hash.

According to another aspect disclosed herein, there is provided a computer-implemented method of executing a digital contract between a first party of a blockchain network and a second party of the blockchain network, the digital contract being for transferring an amount of a digital asset from the first party to the second party based on a condition of the contract being fulfilled; the method being performed by the second party and comprising: obtaining a data element representing a condition of the contract, the condition being linked to the second party; obtaining an authentication path, the authentication path for generating a candidate root hash of a hash tree that has been generated by the trusted third party, and wherein the authentication path comprises a set of hashes, wherein the set of hashes comprises a hash key generated based on a secret value known only to the trusted third party, and one or more sets of internal hashes, each set of internal hashes belonging to a different internal layer of the hash tree; and generating a transaction for inclusion in the blockchain, wherein the transaction comprises an unlocking script for unlocking the amount of the digital asset from the first party, and wherein the unlocking script comprises the obtained data element and the obtained authentication path.

A hash tree (also known as a Merkle tree) contains cryptographic hashes. The term "Merkle tree" is sometimes used in the literature to refer to a binary hash tree, though the original disclosure by Merkle was not limited to binary hash trees and elsewhere in the literature "hash tree" and "Merkle tree" are used synonymously. Merkle tree and hash tree are used interchangeably herein unless the context requires otherwise. The term "tree" refers to a branching data structure, the tree having a "root" at the top and "leaves" at the bottom. A Merkle tree is constructed by recursively hashing pairs of nodes until there is only one hash, called the root hash, or Merkle root. The root hash represents an overall digital fingerprint of a set of data elements, providing an efficient process to verify whether a specific data element is included in the set. To prove that a specific data element is included in the set, a proving party only needs to produce a relatively small number of hashes, constituting an authentication path or "Merkle path" connecting the specific data element to the root hash of the hash tree.

The present disclosure recognizes a way in which Merkle trees, or more generally hash trees, can be exploited to compress and encode the conditions of a smart contract in a transaction using a single hash value (the Merkle root). Furthermore, the smart contract ensures that if the trusted party attests to a condition being met by the proving party, the proving node can access and spend the amount of the digital asset.

Only the trusted party (e.g. an oracle) has access to the secret value on which one or more of the leaf hashes are based. Therefore, only the trusted party can generate the Merkle root of the hash tree and a valid Merkle path for the condition that has been met. On that basis, if the proving party (or spending party) can provide a valid Merkle proof that results in the same Merkle root generated by the trusted party, the verifying party (or paying party) can be confident that the trusted party has provided the Merkle path to the proving party.

The present disclosure enables secure smart contract execution with minimal requirements on script. The verifying party only need know the Merkle root to verify that the proving party has the data required and correct key hash given to them by the trusted party. That is because knowledge of the key hash is required to the leaf hash paired with the hash of the data element, whilst it does not of itself enable the calculation of other hashes of the Merkle tree. The specific Merkle path that applies to the valid data will also be transmitted by the trusted party, minimizing the computational requirements on the prover. In effect the Merkle path acts as evidence that the data has been authenticated by the trusted party. By only giving the verifier the Merkle root the smart contract can be encoded in a way that does not reveal the data (required to transfer the digital asset from the paying party to the spending party) until the spending transaction has been submitted.

The depth of the Merkle tree constructed by the trusted party scales logarithmically with the number of data elements (or conditions, outcomes, etc.). This allows for more efficient encoding smart contracts that depend on many conditions.

According to another aspect disclosed herein, there is provided a computer-implemented method of encoding a digital contract between a first party of a blockchain network and a second party of the blockchain network, the digital contract being for transferring an amount of a digital asset from the first party to the second party based on a condition of the contract being fulfilled; the method being performed by a trusted third party and comprising: in response to determining that a condition of the contract linked to the second party has been fulfilled, providing the second party with a signature of the trusted third party for inclusion in a transaction of the blockchain, wherein the signature signs a data element representing the fulfilled condition.

According to another aspect disclosed herein, there is provided a computer-implemented method of generating a digital contract between a first party of a blockchain network and a second party of the blockchain network, the digital contract being for transferring an amount of a digital asset from the first party to the second party based on a condition of the contract being fulfilled; the method being performed by the first party and comprising: obtaining a root hash of a hash tree, wherein the hash tree comprises a layer of leaf hashes, and wherein at least some of said leaf hashes are each generated based on a respective one of a plurality of data elements, each data element representing a different condition of the contract, and wherein at least one of the different conditions is linked to the second party; and generating a transaction for inclusion in the blockchain, wherein the transaction comprises a locking script for locking the amount of the digital asset to the first party, and wherein the locking script comprises the root hash, and wherein the locking script is configured, so as when executed together with an unlocking script of a later transaction, to determine whether the unlocking script comprises: i) a data element representing a condition of the contract that has been signed with a signature of a trusted third party, and ii) an authentication path for generating, using the signed data element, a candidate root hash that matches the obtained root hash.

According to another aspect disclosed herein, there is provided a computer-implemented method of executing a digital contract between a first party of a blockchain network and a second party of the blockchain network, the digital contract being for transferring an amount of a digital asset from the first party to the second party based on a condition of the contract being fulfilled; the method being performed by the second party and comprising: obtaining a data element representing a fulfilled condition of the contract, the condition being linked to the second party; obtaining an authentication path for generating a candidate root hash of a hash tree using the obtained data element, wherein the hash tree comprises a layer of leaf hashes, and wherein at least some of said leaf hashes are each generated based on a respective one of the plurality of data elements, each data element representing a different condition of the contract, and wherein the plurality of data elements comprises the obtained data element; obtaining a signature and a public key of a trusted third party, wherein the signature signs the fulfilled condition; generating a transaction for inclusion in the blockchain, wherein the transaction comprises an unlocking script for unlocking the amount of the digital asset from the first party, and wherein the unlocking script comprises the obtained authentication path, the public key, and the obtained data element signed with the signature.

The present disclosure also provides techniques for generating and enforcing condition-dependent smart contracts without requiring a trusted party to perform calculations for every new transaction that includes the same data.

Mutually exclusive conditions of the contract may be used (e.g. by the trusted party) to construct a Merkle tree, and only the Merkle root is required by the paying party in order to construct a smart contract. This reduces the overall size of the contract and requires less unused script data.

A fulfilled condition of the contract is authenticated by a trusted third party, e.g. by being signed with a Rabin signature. The authenticated condition is included directly in the spending (unlocking) script, thus reducing the amount of work required by the data provider.

Parties can then ensure that the conditions of a smart contract are respected without needing the entire contract explicitly recorded in the transaction. Instead the spender or winner of the digital asset needs to prove that he/she has met some conditions and that the specific conditions being met are part of the contract.

According to another aspect disclosed herein, there is provided a computer-readable storage medium comprising a transaction for implementing a digital contract between a first party of a blockchain network and a second party of the blockchain network, the digital contract being for transferring an amount of a digital asset from the first party to the second node based on a condition of the contract being fulfilled, wherein the transaction comprises a locking script for locking the amount of the digital asset to the first party, wherein the locking script comprises a root hash, and wherein the root hash of a hash tree generated by a trusted third party, the hash tree being generated based on i) a plurality of data elements, each data element representing a different condition of the contract, and wherein at least one of the different conditions is linked to the second party, and ii) one or more different hash keys generated based on a secret value known only to the trusted party.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 11 and 12 illustrate example transactions generated, respectively, by a verifier and a prover, whereby a Merkle root is used to encode the conditions of a smart contract.

DETAILED DESCRIPTION OF EMBODIMENTS

Example System Overview

Figure 1:
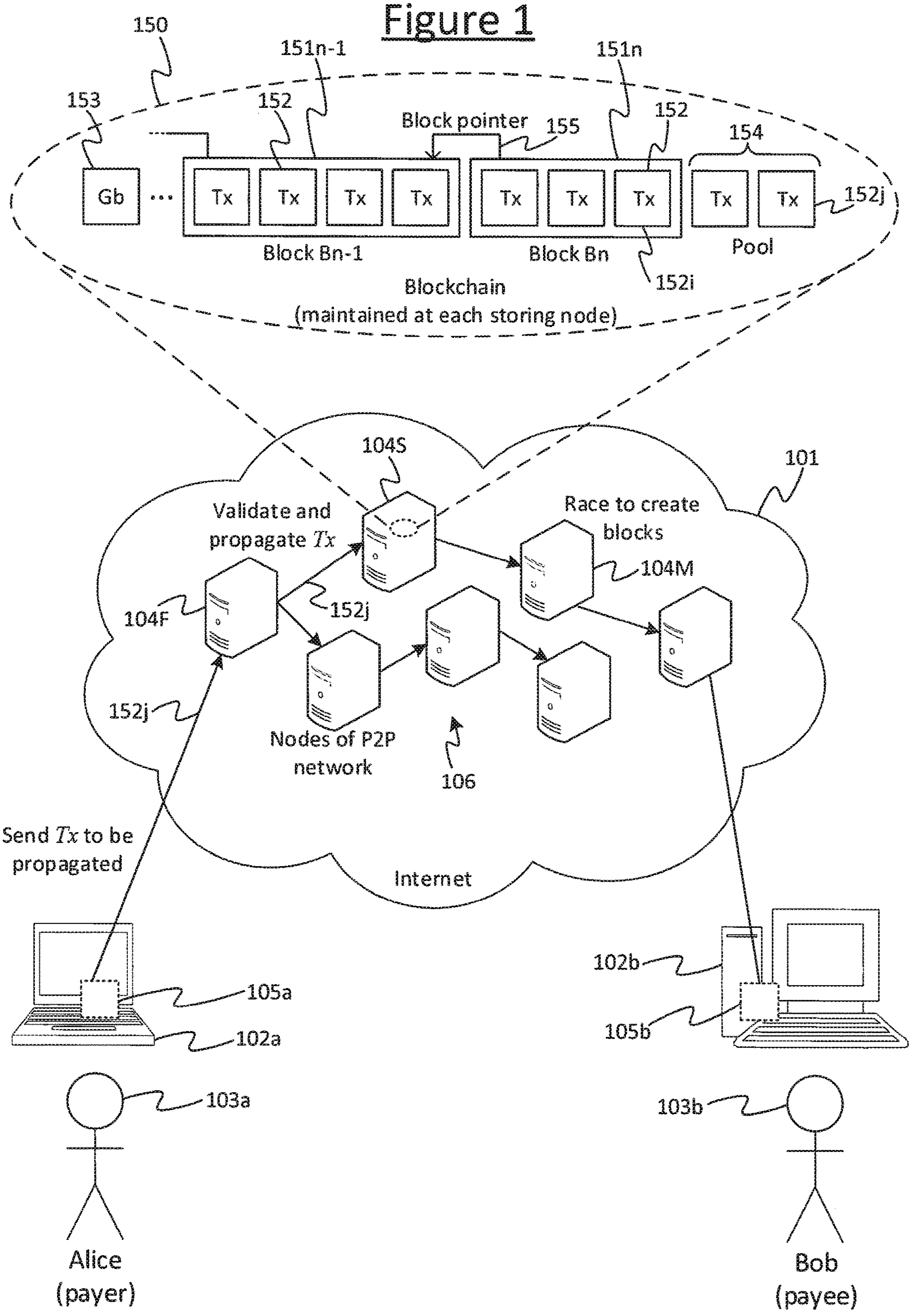
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme.

A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152$j$, the (or each) input comprises a pointer referencing the output of a preceding transaction 152$i$ in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node.

A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Figure 2:
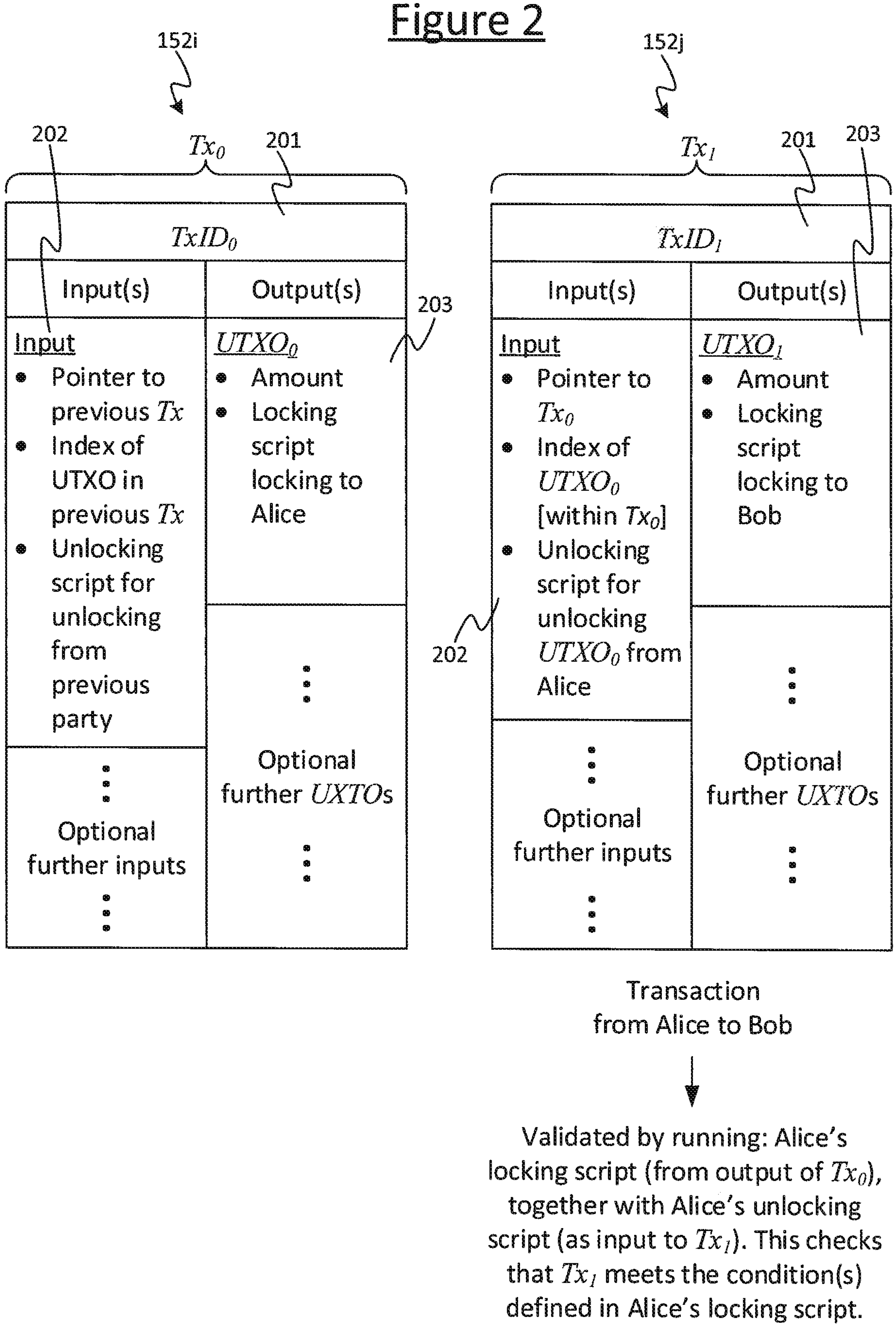
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H(Pa)>OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
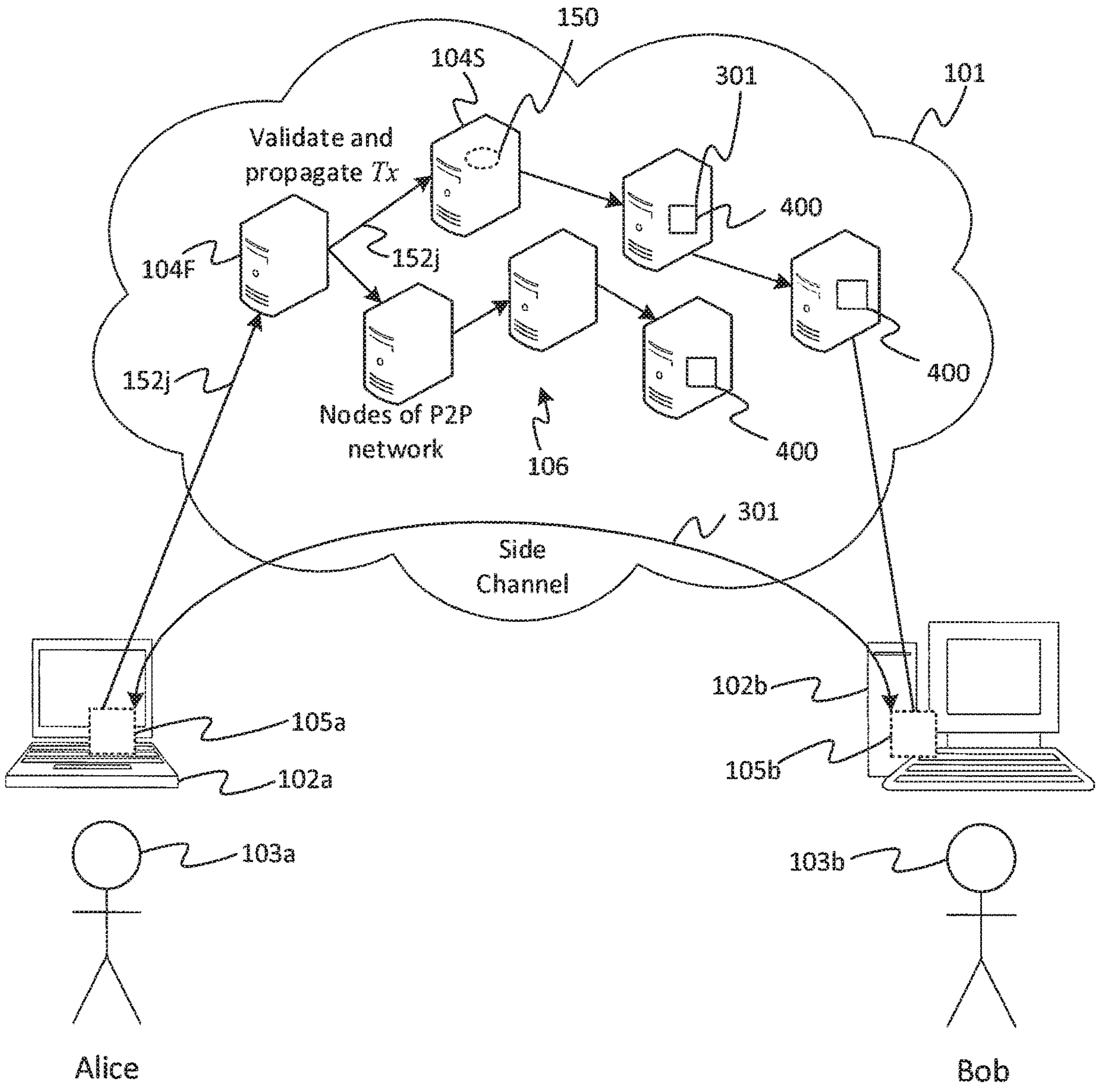
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102*a*, 120*b*, respectively, comprises additional communication functionality. That is, it enables Alice 103*a* to establish a separate side channel 301 with Bob 103*b* (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102*b*. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
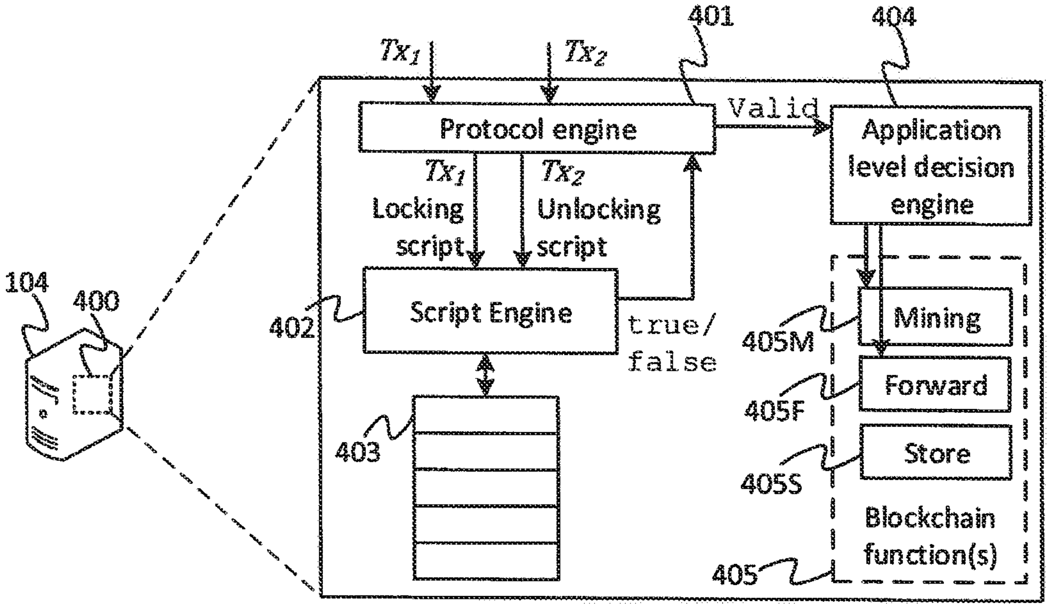
FIG. 4 is a schematic block diagram of a piece of node software for processing transaction in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction 152*m* ($Tx_m$) is received having an input pointing to an output (e.g. UTXO) of another, preceding transaction 152*m*-1 ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Merkle Trees

Figure 5:
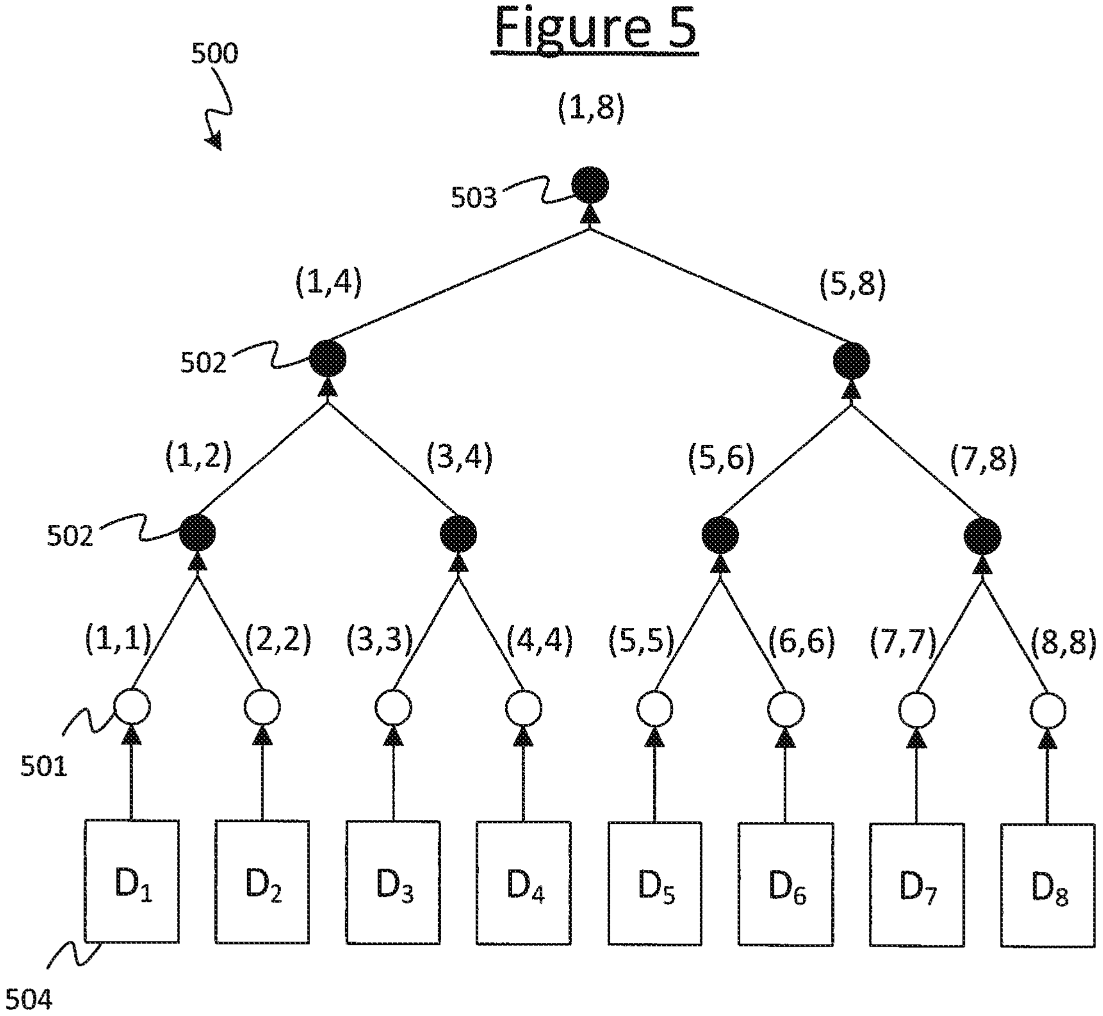
FIG. 5 is a schematic representation of an example Merkle tree.

FIG. 5 illustrated an example structure of a Merkle tree 500. A Merkle tree is also referred to in the art as a hash tree. The terms are used interchangeably herein. Each node in the tree (illustrated by a circle) is given an index pair (i,j) and is represented as N(i,j). The indices i,j are numerical labels that are related to a specific position in the tree. A feature of the Merkle tree is that the construction of each of its nodes is governed by the following equations:

$$N(i,j) = \begin{cases} H(D_i) & i = j \\ H(N(i,k) \| N(k+1,j)) & i \neq j \end{cases},$$

where k=(i+j−1)/2 and H is a cryptographic hash function.

FIG. 5 shows that the i=j case corresponds to a leaf node 501, which is simply the hash of the corresponding $i^{th}$ block of data $D_i$. The i≠j case corresponds to an internal node 502 or root node 503, which is generated by recursively hashing and concatenating child nodes in the tree until the specific node or the root is reached. A leaf node of the tree is also referred to herein as a leaf hash. Similarly, internal nodes and root nodes also referred to as internal hashes and root hashes respectively. The construction of Merkle trees requires the use of cryptographic hash functions.

The primary function of a Merkle tree in most applications is to facilitate a proof that some data block $D_i$ 504 is a member of a list or set of N data blocks $D \in \{D_1, \ldots, D_N\}$. Given a root hash and a candidate data block $D_i$, this can be treated as a 'proof-of-existence' of the block within the set. The mechanism for such a proof is known as a hash tree proof (or a Merkle proof) and comprises obtaining a set of hashes known as the hash or authentication path (or a Merkle path) for a given data block $D_i$ and root R. The authentication path for a data block is the minimum list of hashes required to reconstruct the root R by way of repeated hashing and concatenation.

Figure 6:
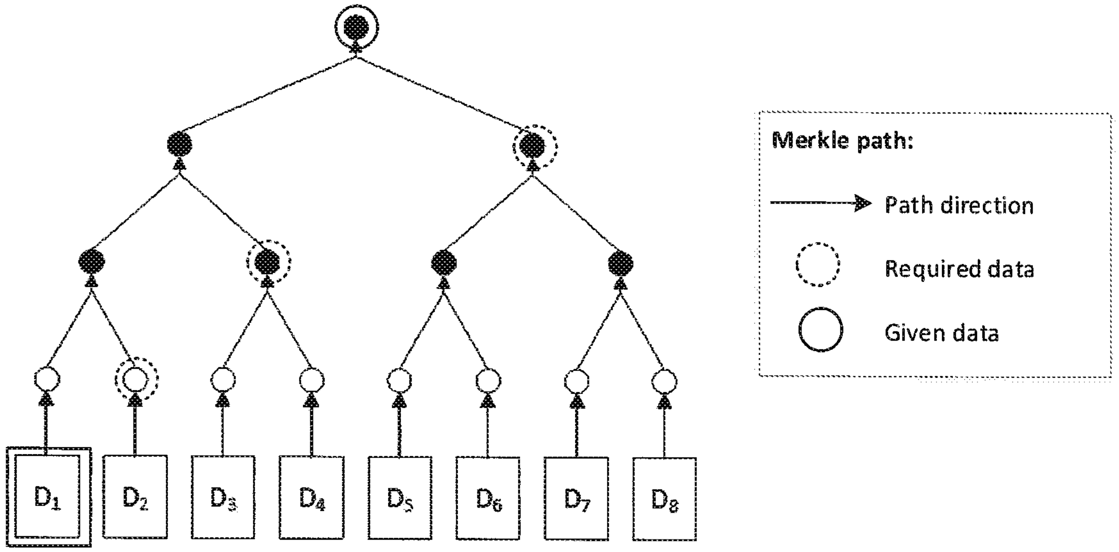
FIG. 6 is a schematic representation of a Merkle proof.

FIG. 6 shows a Merkle proof-of-existence of a data block $D_1$, in a tree represented by a root R, using a Merkle path. Given a Merkle root R, it can be proved that the data block $D_1$ belongs to the set D E $\{D_1, \ldots, D_N\}$ represented by R by performing a Merkle proof as follows:

1) Obtain the Merkle root R from a trusted source.
2) Obtain the Merkle path F from a source. In this case, F is the set of hashes:
   Γ={N(2,2), N(3,4), N(5,8)}.
3) Compute a Merkle proof using $D_1$ and F as follows:
   a. Hash (or double-hash, depending on implementation) the data block to obtain:
      $N(1,1)=H(D_1)$.
   b. Concatenate with N(2,2) and hash to obtain:
      N(1,2)=H(N(1,1) II N(2,2)).
   c. Concatenate with N(3,4) and hash to obtain:
      N(1,4)=H(N(1,2) II N(3,4)).
   d. Concatenate with N(5,8) and hash to obtain the root:
      N(1,8)=
      H(N(1,4)||N(5,8)),
      R'=N(1,8).

e. Compare the calculated root R' with the root R obtained in (1):

I. If R'=R, the existence of $D_1$ in the tree, and therefore the data set D, is confirmed.

II. If R'≠R, the proof has failed and $D_1$ is not confirmed to be a member of D.

This demonstrates that performing the Merkle proof for a given block $D_1$ and root R is effectively traversing the Merkle tree 'upwards' by using only the minimum number of hash values necessary. This is an efficient mechanism for providing a proof-of-existence for some data as part of the data set represented by a Merkle tree and its root.

The hash tree proof comprises concatenating a hash of the candidate data field with the at least one leaf hash in an ordered set of hashes (the hash tree path). This generates an internal hash (or internal node of the hash tree). The generated internal hash is then concatenated with one or more hashes in the hash tree path (a single hash if the hash tree is a binary hash tree). The concatenated internal hashes are then hashed to generate the next hash. Depending on the size of the hash tree (e.g. the number of data fields), the next hash may be another internal hash or the root hash. If the next hash is another internal hash, the process of concatenating with one or more internal hashes from the hash tree path and hashing the result is followed until the root hash is generated. Note that each hash in the hash tree path is only used once.

Importantly, the number of operations required to verify that a given data packet belongs to a Merkle tree scales logarithmically with the number of leaf nodes.

Rabin Signatures

Within a current blockchain protocol, a valid Elliptic Curve Digital Signature Algorithm (ECDSA) signature can only be generated if a message being signed is the (serialised) transaction. This means that if a party requires signed data to execute a contract encoded in a transaction, that party will also need to sign the entire transaction. As a result, the current protocol prevents data signature re-use.

However, the Rabin cryptosystem can be used to generate and validate signatures for arbitrary data types used in a blockchain transaction. Rabin signatures per se will be familiar to those in the art. Unlike the ECDSA signature scheme, which uses Elliptic curve arithmetic, Rabin signatures rely on the difficulty of integer factorisation for security. The Rabin signature algorithm can be summarised as follows.

Key Generation: The signer's private key is the pair (p,q) where p≡3 mod 4 and q≡3 mod 4 are prime. The public key is n=p·q.

Signature Generation: For a message m choose a random U such that $$H(m\|U)^{\frac{p-1}{2}} \equiv 1 \bmod p \text{ and } H(m\|U)^{\frac{q-1}{2}} \equiv 1 \bmod q$$

then the Rabin signature is given by $$S \equiv \left[\left(p^{q-2} \cdot H(m\|U)^{\frac{q+1}{4}} \bmod q\right) \cdot p + \left(p^{q-2} \cdot H(m\|U)^{\frac{p+1}{4}} \bmod p\right) \cdot q\right] \bmod n$$

where H is a hash function with same number of output bits as n.

Signature Verification: Provided (S,U,n) and message m check that $S^2 \equiv H(m\|U) \bmod n$.

Verifying Rabin signatures is computationally easy and can be done in script using stack operations. Importantly, when being used as part of a larger transaction the verification procedure does not require any knowledge of the contents of the message being signed (other than that it is a data array of arbitrary size). This means that the creator of the locking script only needs to know the public address of the data source. Another feature of the Rabin digital signature algorithm is that the signer can choose the level of security by having full control over the bit-size of the signing keys.

A small number of arithmetic and stack manipulation opcodes are required to verify a Rabin signature. The opcodes set out below will be familiar to those skilled in the art. The "Redeem script" for verifying a Rabin signature is as follows:

OP_2 OP_PICK OP_TOALTSTACK OP_DUP OP_TOALTSTACK OP_DUP OP_TOALTSTACK

OP_HASH160<$H_{160}$(n)>OP_EQUALVERIFY OP_SWAP OP_CAT FUNC_HASH3072

OP_FROMALTSTACK OP_MOD OP_SWAP OP_DUP OP_MUL OP_FROMALTSTACK OP_MOD

OP_EQUALVERIFY OP_FROMALTSTACK

In this case the script will execute without failing, leaving the signed message on stack if and only if is provided with the input:

<S><U><m><n> where m is the message, and (S,U) is a valid Rabin signature. Alternatively, the redeem script can be designed to leave TRUE (or a representation of TRUE) as the top stack item if the following script is used:

OP_2 OP_PICK OP_TOALTSTACK OP_DUP OP_TOALTSTACK OP_DUP OP_TOALTSTACK

OP_HASH160<$H_{160}$(n)>OP_EQUALVERIFY OP_SWAP OP_CAT FUNC_HASH3072

OP_FROMALTSTACK OP_MOD OP_SWAP OP_DUP OP_MUL OP_FROMALTSTACK OP_MOD

OP_EQUAL OP_FROMALTSTACK OP_SWAP

This version of the Rabin signature check may be used if the successful Rabin signature verification is used to execute OP_IF branches (as is the case for blockchain escrow contracts). For brevity, the above examples of Rabin signature verification opcodes are referred to hereinafter as [RABIN SIG CHECK].

Digital (Smart) Contracts

Embodiments of the present disclosure provide techniques for constructing and executing digital contracts, or so-called smart contracts, and for facilitating the construction and execution of those contracts.

A digital contract enables a first party 103*a* to transfer a digital asset to a second party 103*b* if and only if a condition of the contract is met. Similarly, a digital contract ensures that the second party 103*b* can enforce the contract if the condition is met. This contrasts with traditional contracts where either party can renege on the contract or disagree as to whether a condition of the contract has been met.

Figure 7:
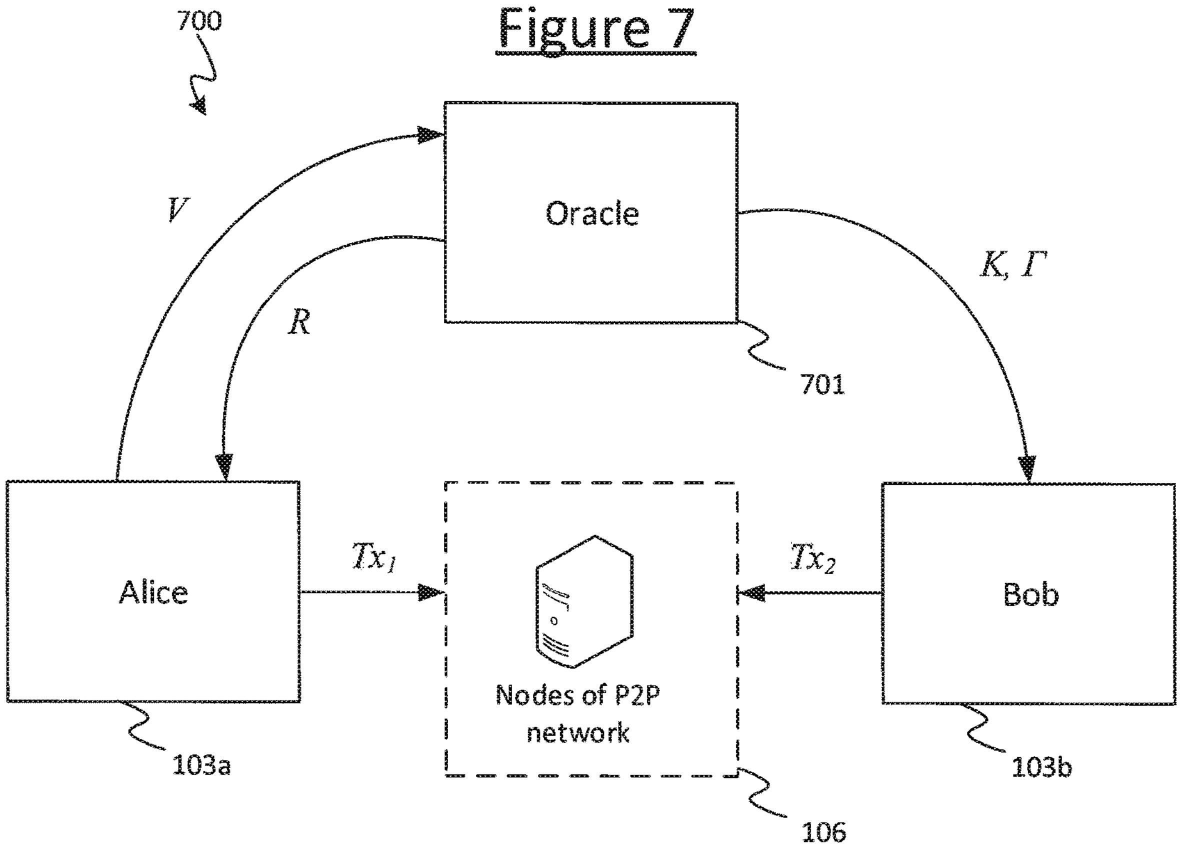
FIG. 7 is an example block diagram representing interactions between parties when executing a smart contract.

Embodiments will first be described with reference to FIG. 7. FIG. 7 shows a system 700 comprising a first party (Alice) 103*a*, a second party (Bob) 103*b*, and a trusted third party (oracle) 701. Alice and Bob are each users of a blockchain network and operate computer equipment 102*a*, 102*b* configured to perform the method described herein. The Oracle 701 may or may not be a user of the blockchain network. The Oracle 701 also operates computer equipment (not shown) configured to perform the method described herein. The third party (Oracle) is trusted in the sense that Alice 103*a* and Bob 103*b* trust data that is generated and/or published by the third party. For instance, the third party 701 may be a weather service that publishes temperature readings e.g. average daily temperature readings for a particular city.

The oracle may take the form of a server comprising one or more physical server units, or even whole a data centre. Alternatively the oracle could take the form of a user terminal or a group of user terminals networked together. That is, the oracle may be an individual user or a group of users such as an organisation, e.g. a company, an academic institution, a charity, etc. In general the oracle comprises computer equipment. The computer equipment comprises processing apparatus comprising one or more processors, e.g. one or more central processing units (CPUs), accelerator processors, application specific processors and/or field programmable gate arrays (FPGAs). The computer equipment also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The memory of the oracle stores software configured to run on the processing apparatus of the node computer equipment in order to perform its respective role or roles. It will be understood that any action attributed herein to the oracle may be performed by the software run on the processing apparatus of the oracle's computer equipment.

The Oracle may communicate with Alice and Bob, e.g. via the internet 101. Alice and Bob are each configured to transmit transactions to nodes of the blockchain network 106. Alice and Bob may also communicate via a side channel 301 (not shown in FIG. 7).

Alice and Bob would like to construct a digital contract that ensures that Alice transfers an amount of a digital asset if one of a plurality of possible conditions V of the contract is fulfilled. For instance, the possible conditions may be the price of a commodity or the outcome of an insurable event. Alice wants to ensure that a condition of the contract is fulfilled before the digital asset can be claimed by Bob. Alice and Bob also want to ensure that a trusted party is an arbitrator of whether a condition has been met.

To preserve a level of privacy of both Alice and Bob, Alice may not want to include the conditions of the contract in a transaction since the transaction will, when validated, form part of the blockchain 150 and be accessible by any user of the blockchain. Alice would therefore like to encode the conditions of the contract within a transaction in such a way that they cannot be determined by any unnecessary third party user of the blockchain 150.

Additionally, or alternatively, the contract may contain a larger number of conditions. One of the main hurdles preventing the execution of smart contracts using script is the strict size limits that apply to individual scripts. A 520-byte limit exists for pay to script hash (P2SH) and 10,000-byte limit for bare scripts. Whilst these limits reduce security risks by eliminating the possibility of denial-of-service (DoS) type attacks on miners 104M, they put a very tight limit on the amount of raw script that can be used to represent a smart contract. Therefore, Alice would like to encode the conditions of the contract in an efficient way which reduces the size of the script.

Once the conditions are agreed upon, Alice and/or Bob transmit the set of conditions V (or data representing the conditions) to the Oracle. The Oracle uses the different conditions of the contract to generate a Merkle tree 500. That is, each condition is hashed (or double-hashed) using a hash function to generate a leaf hash 501 of the tree. The root 503 of the hash tree (the Merkle root R) is a hash value that encodes the conditions of the contract. The Merkle root R cannot be reverse engineered to obtain the conditions.

To ensure that Alice and Bob cannot themselves construct the Merkle root R using only the data elements, the Oracle includes a hash key K as one or more leaves of the hash tree 500. Each hash key K is a hash value derived from a secret S (e.g. a randomly generated number or string) known only to the Oracle. Each hash key K may be the same hash key. Alternatively, each hash key K may be a different hash key. For instance, a first hash key $K_1$ may be a hash of the secret S, and a second hash key $K_2$ may be hash of the first hash key $K_1$. Alternatively, the first hash key $K_1$ may be hash of the secret and a first value (e.g. S+i), the second hash key $K_2$ may be hash of the secret and a second, different value (e.g. S+2i), and so on. Since the secret is known only to the Oracle, only the Oracle can reconstruct the Merkle root R.

The Oracle transmits the Merkle root R to Alice for inclusion in the digital contract. Alternatively, the Oracle may publish the Merkle root R, e.g. on the internet 101, such that it can be accessed by Alice. Alice can now construct a transaction $Tx_1$ that makes use of the Merkle root. Alice constructs a transaction $Tx_1$ that comprises a locking script that locks an amount of the digital asset to Alice. The locking script comprises the Merkle Root. The locking script is described in more detail below. Once the transaction is constructed, Alice transmits the transaction $Tx_1$ to the network for inclusion in the blockchain, i.e. by a mining node.

Later, a condition $V_1$ of the contract is fulfilled and so Bob would like to receive the agreed upon amount of the digital asset. For instance, the condition $V_1$ may be the data packet encoding the insurable outcome that enables Bob to receive a pay-out. In order to do so, Bob needs to generate a transaction $Tx_2$ having an unlocking script that unlocks the locking script of Alice's transaction $Tx_1$. As discussed, Alice and Bob have agreed that the Oracle is trusted to decide whether a condition has been met. Upon deciding that the condition $V_1$ has been met, the Oracle transmits an authentication path (Merkle path) Γ to Bob. The Merkle path Twill include a hash key K generated by the Oracle during generation of the Merkle tree, and one or more hashes of the Merkle tree required to reconstruct the Merkle root. The Merkle path F obtained from the Oracle may also include $V_1$ (or a data element representing $V_1$). Alternatively, Bob already has access to $V_1$. Bob now constructs an unlocking script of $Tx_2$ which contains $V_1$, a hash key K and one or more hash values. Together, these values can be used to perform a Merkle proof, i.e. to generate a candidate Merkle root and compare it to the Merkle root generated by the Oracle (and included in $Tx_1$). Bob transmits the transaction $Tx_2$ to the network for inclusion in the blockchain.

Returning now to the locking script constructed by Alice. As shown in FIG. 4, during validation of $Tx_2$, the locking script of $Tx_1$ is executed alongside $Tx_2$. The locking script generated by Alice is configured to perform a Merkle proof using the Merkle root included in the locking script of $Tx_1$ and the elements included in the unlocking script of $Tx_2$. If the candidate Merkle root generated using the element in the unlocking script of $Tx_2$ matches (i.e. is identical to) the Merkle root included in the locking script of $Tx_1$, the digital asset is unlocked from Alice and can be transferred to a party of Bob's choosing. In other words, the unlocked amount of the digital asset (e.g. some or all of the amount) can be included in an unspent transaction output of $Tx_2$.

FIG. 7 illustrates one example of the flow of information between Alice 103*a*, Bob 103*b* and the Oracle 701 according to these embodiments. As shown, the Oracle obtains the conditions V of the contract from Alice. The Oracle uses those conditions and the secret to construct a Merkle tree having a Merkle root R. The Oracle transmits the Merkle root R to Alice so that Alice can construct a transaction $Tx_1$ which incorporates the root R in the locking script of that transaction $Tx_1$. Alice broadcasts the transaction to the P2P network. The transaction $Tx_1$, if valid, will be mined to the blockchain. When the Oracle deems a condition $V_1$ of the contract to have been fulfilled, the Oracle provides Bob with a Merkle path Γ and a hash key K (generated using the secret). Together the Merkle path Γ and hash key K can be used to generate the Merkle root R. Bob then constructs a transaction $Tx_2$ which incorporates the Merkle path Γ, condition $V_1$ and hash key K in the unlocking script of that transaction $Tx_2$. If valid, the transaction $Tx_2$ will be mined to the blockchain 150.

Embodiments will now be described with reference to FIG. 9. The Oracle operates a protocol to both authenticate and compress a large amount of indexed data using Merkle trees. In so doing the Oracle can enable the creation of multiple transactions that require external data to execute. The Oracle is not a party to either the smart contract or the blockchain transaction. Alice and Bob are parties in a blockchain transaction smart contract where Alice is the payer and Bob is the intended receiver of a digital asset. In order to spend the digital asset Bob must prove that he has met some required condition in the contract and part of this proof will include external data. Hence Bob will be referred to as a prover and Alice as a verifier.

To start with the Oracle creates a secret string of bits or a secret number that is never shared. For example, the secret may be the number 10. Using of a cryptographic hash function, such as SHA256, the key is securely generated by hashing the secret:

$$H(\text{secret})=\text{Key}$$

The hash digest (denoted Key) can be transmitted to the prover when suitable. Moreover, a sequence of key hashes can be generated using a deterministic key generation protocol. For example:

$$H(\text{secret}+i)=\text{Key}_i\ i=\{0,1,\ldots,N\}$$

Figure 9:
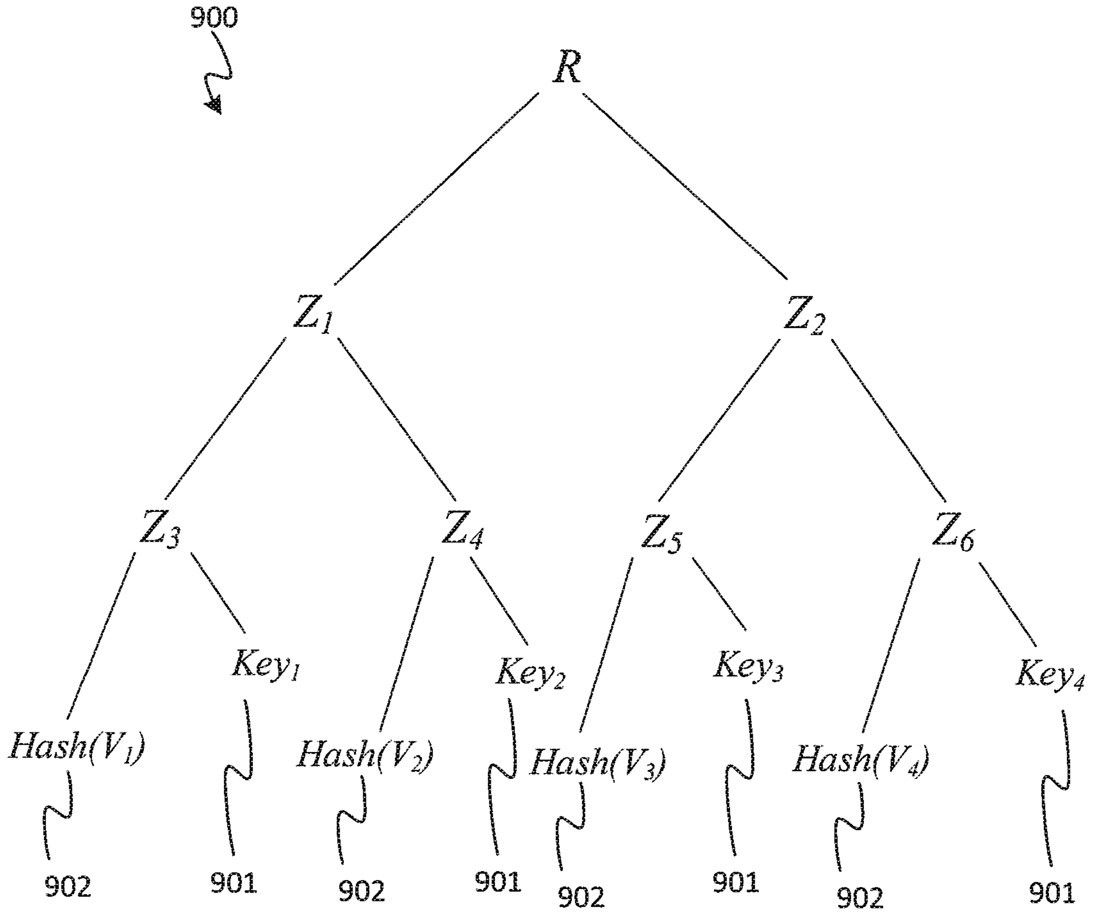
FIG. 9 is a schematic representation of an example Merkle tree where hash keys generated using a secret value form some of the leaves of the tree.

As shown in FIG. 9, the Oracle may construct the Merkle tree 900 with each right leaf node the $\text{Key}_i$ 901 and each left leaf node 902 being the indexed data $V_k$, $k\in\{1,\ldots,N\}$. The purpose of the Merkle tree 900 is to provide evidence that Alice is requiring data from the prover, without publishing the data itself on the blockchain prior to the data being used. When requested the Oracle then publishes the Merkle root R which may be used in a future blockchain transaction to verify data authenticity.

Once the $\text{Key}_i$ is obtained, one can prove that the hashed value is part of the Merkle tree 900. The prover can provide a Merkle path which can be verified against the Merkle root that has already been published (e.g. transmitted to Alice) by the Oracle. In this case the Merkle proof enables verification of the data and data authenticity.

Advantages of the above are that data can be authenticated using a Merkle tree, the generation of keys and Merkle trees is easy and computationally efficient, and a large amount of independent data can be pre-signed with a single key. Furthermore, the Merkle tree depth (and hence the Merkle proof) scales logarithmically with the number of possible values, meaning a large amount of indexed data can be signed.

Since the key hash associated with the Merkle tree leaf is revealed once a valid Merkle proof is provided by the prover, the key hash needs to be discarded and a new Merkle tree needs to be constructed for each new transaction. However, this will require minimal computation as the data in the left leaf nodes remains the same.

Say for example the Oracle has 4 conditions $V_1, \ldots, V_4$ which are known publicly or have been sent by Alice. To begin with the Oracle publishes the Merkle root so that the verifier can create the verification (i.e. locking) script. Once the verifier has constructed the locking script with the Merkle root i.e. created the transaction that encodes the smart contract, the Oracle can check whether Alice uses the correct Merkle root. Once the Oracle decides on an outcome the key and Merkle proof can be transmitted to the prover (Bob).

Say, for example, that the data $V_1$-$V_4$ represents the outcomes of a boxing match that enables Bob to spend Alice's output. Consider the following script snippet which verifies the Merkle proof for $V_1$:

Step 1: Alice agrees on a smart contract whereby Alice will transfer an amount of a digital asset to Bob if outcome $V_1$ happens. Alice and Bob send this data to the Oracle.

Step 2: The Oracle constructs a Merkle tree using this data $V_1$-$V_4$ and a secret key as leaves (see FIG. 9). The Oracle then sends Alice R to be included as part of Alice's verification algorithm.

Alice's Locking Script (snippet): OP_SHA256 [OP_CAT OP_SHA256]*3<R> OP_EQUAL

The Oracle can look for this script in Alice's transaction and ensure that the correct Merkle root has been included. If the correct Merkle root has not been included, the Oracle can alert Bob and/or the public that Alice has not created the (correct) contract script yet. This is not a security vulnerability than asking Alice to create the transaction with the correct R in the first place (Alice has to create the transaction with the script and sign it). This method simply allows the Oracle to verify that the contract has been created.

Step 3: $V_1$ is the valid outcome. The Oracle sends the Key $\text{Key}_1$ and Merkle path to Bob. Bob can then construct a Merkle proof of $V_1$.

Bob Unlocking script (snippet): <$Z_2$><$Z_4$><$\text{Key}_1$><$V_1$>

When executed this proof demonstrates that the prover knows both the key hash and leaf data and that the data itself is also included in the unlocking script.

Explicitly, Alice's locking script will hash $V_1$ and concatenate with $\text{Key}_1$ (i.e. to generate $Z_3$). The result will be concatenated with $Z_4$ and then hashed (i.e. to generate $Z_1$). The result will be concatenated with $Z_2$ and then hashed (i.e. to generate R). The result will then be checked for equality with R.

The data and Merkle path together are a proof-of-existence, demonstrating that the data was included in the contract. The key hash demonstrates that the Oracle has given permission for Bob to use the data. Including the key hash is also provides data authenticity, as the Oracle may only give the key hash to Bob if the outcome is valid.

Figure 8:
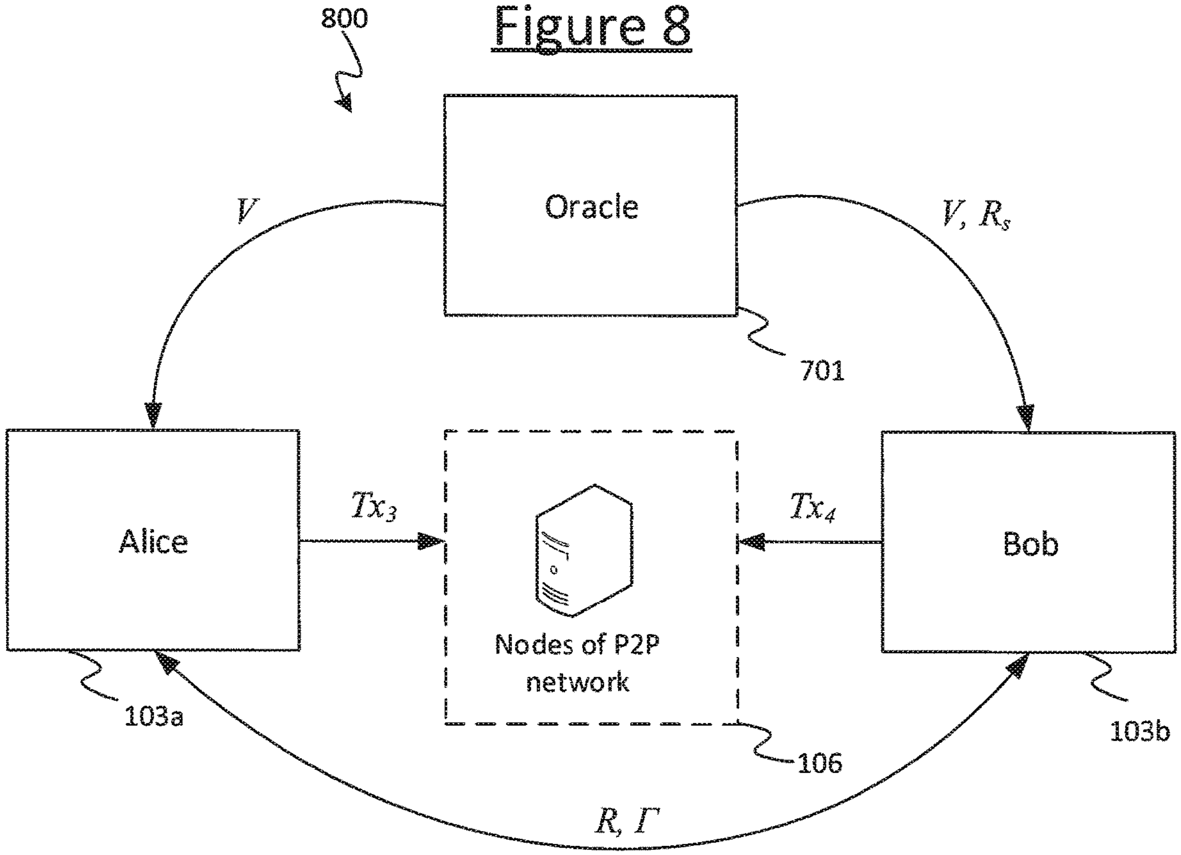
FIG. 8 is an example block diagram representing interactions between parties when executing a smart contract.

Embodiments will now be described with reference to FIG. 8. FIG. 8 shows a system 800 similar to FIG. 7, comprising Alice 103*a*, Bob 103*b*, and a trusted third party (Oracle) 701.

As detailed above, Alice and Bob would like to construct a digital contract that ensures that Alice transfers an amount of a digital asset if one of a plurality of possible conditions V of the contract is fulfilled. Alice and Bob also want to ensure that a trusted party is an arbitrator of whether a condition has been met.

In these embodiments, Alice and Bob may agree on the conditions of the contract and between them agree on a Merkle tree that encodes those conditions. That is, the Merkle tree may be constructed without interacting with the Oracle. For instance, Alice may generate a Merkle tree having a Merkle root. Bob may also generate a Merkle tree having a Merkle root. Bob can then verify that Alice has generated the Merkle root correctly. For this to happen, Alice and Bob must agree on the method (i.e. the algorithm) used to generate the Merkle tree. Alternatively, Alice and Bob may rely on the Oracle to generate the Merkle tree and transmit the Merkle root to Alice, and optionally to Bob.

The Merkle tree used in these embodiments may be constructed without the use of a secret value. The leaves of the Merkle tree may be hashes of the conditions of the contract (i.e. hashes of data elements representing those conditions). Depending on the number of conditions, one or more padding elements may be used as nodes (e.g. leaves) of the Merkle tree. E.g. if there are seven conditions of the contract, one of the hash leaves may be padding (e.g. a hash of zero) in order to form a Merkle tree having eight hash leaves. This may apply to any of the embodiments described herein.

Once Alice has obtained the Merkle root R (e.g. by generating the Merkle root), Alice can generate a transaction $Tx_3$ that transfers an amount of a digital asset to Bob based on a requirement that a condition of a digital contract is met. Alice would like to ensure that the trusted party, the Oracle, attests that the condition has been met, so Alice generates a transaction $Tx_3$ having a locking script that determines whether an unlocking script attempting to unlock that transaction output includes a data element signed using the Oracle's signature $R_s$. Like the transaction described with reference to FIG. 7, the locking script of Alice's transaction also determines whether the unlocking script comprises a Merkle path Γ for performing a Merkle proof using the data element. That is, the locking script is configured to determine whether the (signed) data element and the Merkle path Γ can generate a candidate Merkle root that is identical to the Merkle root R included in the locking script of Alice's transaction $Tx_3$.

The Oracle's signature $R_s$ may be a Rabin signature. Rabin signatures and how they can be used to sign data elements have been described in detail above. Alice's locking script may be configured to perform a Rabin signature check, e.g. [RABIN SIG CHECK] on the data included in Bob's unlocking script.

Alternatively, the Oracle's signature may be an ECDSA signature.

In some examples, Alice may also include additional information in the transaction, e.g. metadata relating to the digital contract. For instance, the metadata may include a description of the contract. As an example, the metadata may be included in an OP_RETURN output of the transaction.

In some examples, Alice may include a time-based redeem option for redeeming the amount of the digital asset if Bob does not successfully transfer ownership of the digital asset within a predetermined amount of time. For instance, the locking script may be configured to allow Alice to unlock the locking script (using an unlocking script of a different transaction generated by Alice) after a period, e.g. one, two, three months, etc., has passed since the transaction was generated or mined to the blockchain. If Bob has not claimed the digital asset, e.g. because a condition of the contract was not fulfilled or the Oracle did not provide Bob with a valid signature, Alice may transmit a transaction to the blockchain network which has an unlocking script configured to unlock the locking script of her previous transaction. The unlocking script may comprise Alice's signature and public key (or a hash thereof).

Once the transaction is generated, Alice transmits the transaction to one or more nodes of the blockchain network for inclusion in the blockchain.

If a condition of the contract is met, the Oracle transmits a signed data element to Bob. The data element represents the fulfilled condition and is the same data element that was used to construct the Merkle root R. The data element is signed with the Oracle's signature $R_s$, e.g. the Oracle's Rabin signature. The Oracle may also provide Bob with the Oracle's (Rabin) public key, e.g. by publishing the (Rabin) public key or transmitting the (Rabin) public key directly to Bob.

Bob may now generate a transaction $Tx_4$ that has an unlocking script configured to unlock an output of Alice's transaction $Tx_3$, i.e. to unlock a locking script in Alice's transaction. The unlocking script of Bob's transaction $Tx_4$ includes the signed data element, the Oracle's public key and a Merkle path Γ for performing a Merkle proof. Bob may obtain the Merkle path from Alice and/or the Oracle (e.g. in examples where Alice and/or the Oracle have generated the Merkle tree). As another example, Bob may obtain the Merkle path Γ by generating the Merkle path (e.g. in examples where Alice and Bob agree on the data elements that form the leaves of the Merkle tree). Once generated, Bob can transmit the transaction to one or more nodes of the network for inclusion in the blockchain 150.

FIG. 8 illustrates one example of the flow of information between Alice, Bob and the Oracle according to these embodiments. Alice and Bob may agree on a Merkle tree. This may involve sharing a Merkle root R between themselves (e.g. Alice may transmit a Merkle root R to Bob and/or vice versa). In some examples, the Oracle may have generated the conditions V of the contract that were used to generate the Merkle tree (or the data elements representing those conditions). In these examples, the Oracle may publish those conditions V or transmit the conditions V directly to Alice and/or Bob, i.e. without publishing to other third parties. Alice broadcasts the transaction $Tx_3$ to the P2P network. The transaction $Tx_3$, if valid, will be mined to the blockchain. When the Oracle deems a condition $V_1$ of the contract to have been fulfilled, the Oracle provides Bob with a signature $R_s$ which signs the fulfilled condition $V_1$. Bob then obtains a Merkle path Γ for the condition that can be used to generate the Merkle root R. The Merkle path Γ may have been transmitted by Alice or the Oracle, or generated by Bob himself. Bob then constructs a transaction $Tx_4$ which incorporates the Merkle path Γ and the signed condition $V_1$ in the unlocking script of that transaction $Tx_4$. If valid, the transaction $Tx_4$ will be mined to the blockchain.

The condition-dependent spending scripts (smart contracts) may use the following aspects. First, mutually exclusive sections of the smart contract script may be used to construct a Merkle tree and only the Merkle root is used by the payer. This reduces the overall size of the contract and unused script data. The full script may be replaced by a Merkle root. Secondly, raw data from a third-party, authenticated with a Rabin signature or Merkle proof, may be used directly in the spending script, reducing the amount of work required by the data provider. Thirdly, the third-party data provider may encode complex messages by using a published indexing system. Parties can then ensure that the conditions of a smart contract are respected without needing the entire contract explicitly recorded in the transaction. Instead the spender or winner of the digital asset needs to prove that he/she has met some conditions and that the specific conditions being met are part of the contract.

In some cases, it may neither be possible nor practical for the Oracle to transmit plaintext messages along with a signature as this may require the oracle to have a large amount of memory and processing power. Instead, the number of possible states of the oracle (and therefore the workload) may be minimized by using binary/hex values to represent a specific range of continuous data. In some examples, the Oracle may only be used to report data related to a specific set of queries (e.g. the air temperature). The Oracle conditions can be indexed, with the indexing published ahead of time. An example scheme is shown in the following table:

| Hexadecimal Value (Index) | Oracle Condition |
|---|---|
| 00 | $\alpha_0 \le x < \alpha_1$ |
| 01 | $\alpha_1 \le x < \alpha_2$ |
| . | . |
| . | . |
| . | . |
| ff | $\alpha_{244} \le x < \alpha_{255}$ |

Using this scheme, up to 256 oracle conditions in the range $A \le x < B$ with $A=a_0$ and $B=a_{255}$ can be represented using a single byte. This precision can be increased as the number of bytes is increased. For instance, if the maximum byte push allowed in a script is 520, in theory, the preceding table could be extended to represent up to approximately $3.4\times10^{153}$ intervals of continuous data.

As an example, if the oracle is reporting data from a platinum resistance thermometer, the Oracle may use a set range of binary values to represent temperatures in a suitable range, say between −50 and 50 degrees Celsius in unit intervals, as shown in the following table:

| Hexadecimal Value (Index) | Oracle Condition-Temperature (° C.) |
|---|---|
| 00 | $-50.0 \le T < -49.0$ |
| 01 | $-49.0 \le T < -48.0$ |
| . | . |
| . | . |
| . | . |
| 64 | $49.0 \le T < 50.0$ |

This simple encoding system can lead to a nearly unbounded range of Oracle conditions being represented directly in script.

Figure 10:
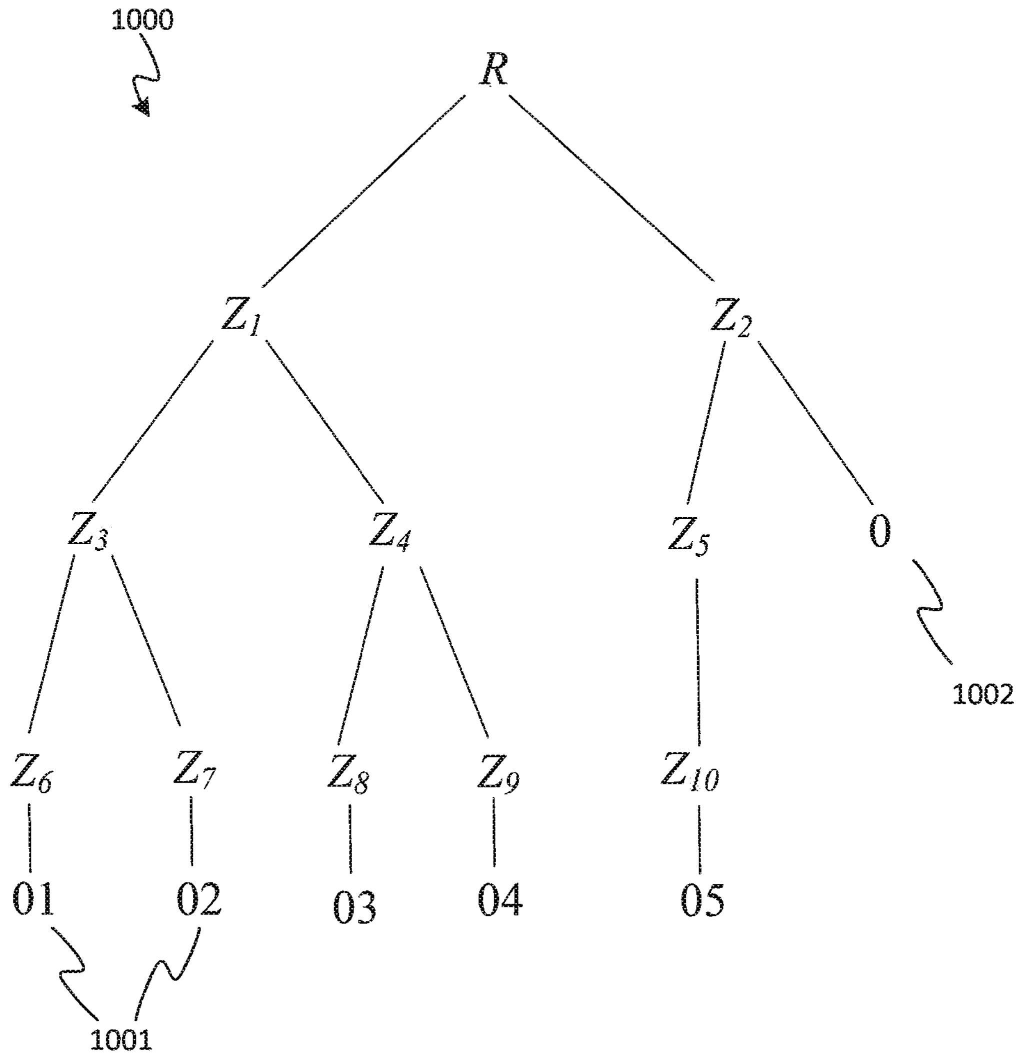
FIG. 10 is a schematic representation of an example Merkle tree where outcomes of a smart contract form leaves of the Merkle tree.

Embodiments will now be described with reference to FIG. 10. In these embodiments the third party (the Oracle) may authenticate data but does not have to perform calculations for every new transaction that includes the data.

Consider a contract between Alice and Bob based on the outcome of a boxing match. Let's say that Alice agrees to transfer a digital asset to Bob if fighter A defeats fighter B in round 3, 5, 7 or 11 or 12. To do so she sets up a smart contract in the form of a P2SH transaction. Furthermore, to ensure that the condition validity is being independently verified, Alice and Bob both agree to use data (relating to the boxing match results) that has been provided by the Oracle. Since both Alice and Bob must agree on the form of the smart contract before, they can also agree on the structure of a "Merklized contract" and specifically the Merkle root. The Oracle's Rabin public key must be known to both Alice and Bob at the time the transaction containing the smart contract is created. Alternatively, Carol may wish to first publish an index instead of the relevant data and signature.

Additional security may be provided by imposing the condition that the digital asset is returned to Alice if the output is not transferred to Bob within a fixed amount of time. This provides additional security in the case that Carol decides not to cooperate (i.e. not to provide a signature).

Using an indexing system described above, the following table relating outcomes to the Oracle message can be published:

| Hexadecimal Value (Index) | Oracle Condition |
|---|---|
| 01 | Round 3 |
| 02 | Round 5 |
| 03 | Round 7 |
| 04 | Round 11 |
| 05 | Round 12 |

The different conditions (in this case specific rounds in the boxing match) are encoded as hex data. A Merkle tree 1000 can then be constructed using the hex values 1001 as leaves, as shown in FIG. 10, where:

$$Z_6=H(01),\ Z_7=H(02),\ Z_8=H(03),\ Z_9=H(04),\ Z_{10}=H(05),$$

$$Z_3=H(Z_7\|Z_8),\ Z_4=H(Z_9\|Z_{10}),\ Z_5=H(Z_{11}\|Z_{11}),$$

$$Z_1=H(Z_3\|Z_4),\ Z_2=H(Z_5\|0),\text{ and}$$

$$R=H(Z_1\|Z_2)$$

Here, H(•) denotes the double SHA-256 hash function i.e. H(x)=SHA256(SHA256(x)). Alternatively, a single hash may be used. A padding value 1002 is used as a node of the tree in this example. Alice creates a transaction to transfer an amount of a digital asset to the winner (who may be unknown at the time the transaction is created). This can either be a non-standard transaction output or, if further compression is desired by the contract creator, a pay-to-script hash (P2SH) output.

Say for example that fighter A defeats fighter B in round 3 and Bob wants to spend his winnings, i.e. transfer the digital asset to another address. He will need to provide a valid signature from Carol as well as evidence that the successful outcome was part of the agreed upon contract.

The Merklized smart contract allows parties to store and execute the contract in an efficient and secure way. Instead of representing the full contract explicitly in script both Alice and Bob have agreed on a Merklized form of the contract. Bob has now obtained the signature from the Oracle and wants to demonstrate:

i) The condition that enables Bob to spend the UTXO has been met, and ii) The condition that has been met is a specific clause in the contract.

An example of a Merklized smart contract is shown below, where the locking script is from Alice's transaction and the unlocking script is from Bob's transaction.

| Unlocking script | Locking script |
|---|---|
| <Bob sig> <Bob Pubkey> <S> <U> <Round 3> <n (Oracle)> [Merkle path] | <Merkle path length> OP_PICK OP_SHA256 (OP_SWAP OP_IF OP_SWAP OP_ENDIF OP_CAT OP_SHA256)*[Tree depth] <R> OP_EQUALVERIFY [RABIN SIG CHECK] OP_IF OP_DUP OP_HASH160 <H(Bob Pubkey)> OP_EQUALVERIFY OP_CHECKSIG OP_ENDIF OP_ELSE <'1 Month'> OP_CHECKSEQUENCEVERIFY OP_DROP OP_DUP OP_HASH160 <H(Alice Pubkey)> OP_EQUALVERIFY OP_CHECKSIG OP_ENDIF |

The first part of the locking script (<Merkle path length> . . . OP_CHECKSIG OP_ENDIF) checks whether the unlocking script comprises a Merkle path for generating the Merkle Root, a condition of the contract signed with the Oracle's Rabin signature, and whether it is transferring ownership of the digital asset to Bob.

Bob can spend the digital asset by demonstrating that (i) 'Round 3' was the condition required for him to spend the escrowed asset and (ii) 'Round 3' was in fact the outcome. If Bob demonstrates (i) and (ii), the second part of the script (OP_ELSE . . . OP_ENDIF) will be unused data. The second part of the script allows Alice to reclaim the digital asset if Bob does not transfer ownership within one month.

Bob's unlocking script comprises a Merkle path, a condition signed with the Oracle's public key, Bob's public key and Bob's signature.

The size of the locking script is reduced and the unused and unexecuted script is minimized. Further compression of the size of the locking script can be achieved using P2SH, shifting the contract execution cost from the contract creator to the spender, e.g. by using the following transaction templates:

Transaction 1 (Alice) P2SH:

Unlocking script/scriptSig < . . . inputs . . . >

Locking script/scriptPubkey OP_HASH160<H(Smart contract redeem script)> OP_EQUAL Transaction 2 (Winner) P2PKH:

Unlocking script/scriptSig <Response to smart contract redeem script><smart contract redeem script byte array>

Locking script/scriptPubkey OP_DUP OP_HASH160<H (P.K.)>OP_EQUALVERIFY OP_CHECKSIG For the Merklized smart contracts, the locking script scales logarithmically with the number of leaf nodes, N, as the opcode sequence (OP_SWAP OP_IF OP_SWAP OP_ENDIF OP_CAT OP_SHA256) must be repeated for each level of the Merkle tree. For small contracts the [RABIN SIG CHECK] sequence will make up a largest proportion of the bytes in the script. Avoiding repetitions of the Rabin signature check sequence by Merklizing the contract greatly reduces the transaction size.

For the redeem script to validate, the response is required to specify the Merkle path, meaning that the size of the response also scales logarithmically with the number of leaf nodes. Most of the data contained in the response is the Rabin signature and public keys (both approximately 300-400 bytes each for the most secure signatures).

The following table highlights the savings in transaction size when using Merklized contracts.

| Scaling properties | Locking Script | Unlocking script | ScriptSig + ScriptPubkey field |
|---|---|---|---|
| Standard contract | Linear N | Constant | Linear N |
| Merklized Contract | $\log_2 N$ | $\log_2 N$ | $\log_2 N$ |

FIG. 11 is an example of a transaction template 1100 that could be used by Alice. Alice's contract can be encoded into a single transaction output 1101. Additional metadata for the contract can be embedded in an OP_RETURN output 1102.

The locking script of Alice's transaction may comprise three distinct elements 1103, 1104, 1105. The first element 1103 checks that the data in an unlocking script attempting to unlock Alice's transaction was indeed a condition of the contract. The second element 1104 checks that Bob is the intended recipient of the digital asset. The third element 1105 allows Alice to reclaim the digital asset if it is not claimed by Bob within a predetermined time period (one month in this example).

FIG. 12 is an example a transaction that could be used by Bob to unlock the digital asset locked to Alice using the example transaction shown in FIG. 11. Bob provides a Merkle path, data (representing the fulfilled condition) and a Rabin signature from the Oracle, along with his own (ECDSA) signature and public key.

It will be appreciated that the above embodiments have been described by way of example only.

More generally, according to a first instantiation of the teachings disclosed herein there is provided a computer-implemented method of encoding a digital contract between a first party of a blockchain network and a second party of the blockchain network, the digital contract being for transferring an amount of a digital asset from the first party to the second party based on a condition of the contract being fulfilled; the method being performed by a trusted third party and comprising: obtaining a plurality of data elements, each data element representing a different condition of the contract, and wherein at least one of the different conditions is linked to the second party; generating a hash tree based on the plurality of data elements, wherein the hash tree comprises: i) a leaf layer comprising a first set of leaf hashes each generated by hashing a respective data element, and a second set of leaf hashes comprising at least one hash key generated by hashing a secret value known only to the trusted third party; and ii) one or more internal layers each comprising a respective set of internal hashes, wherein each internal hash of a respective internal layer is generated by hashing a concatenation of at least two hashes from a lower layer; and iii) a root layer comprising a root hash, the root hash generated by hashing a concatenation of at least two hashes from an uppermost internal layer; and making the root hash available to the first party for inclusion in a transaction of the blockchain.

According to a second, optional instantiation, there may be provided a method according to the first instantiation, wherein said obtaining of the data elements comprises receiving the data elements from the first and/or second parties.

According to a third, optional instantiation, there may be provided a method according to the first or second instantiation, wherein said making available of the root hash comprises transmitting the root hash to the first party.

According to a fourth, optional instantiation, there may be provided a method according to any of the first to third instantiations, comprising: identifying a transaction of the blockchain generated by the first party, wherein the transaction comprises the digital contract, and wherein the digital contract comprises a locking script locking the amount of the digital asset to the first party; determining whether the locking script comprises the root hash; and notifying the second party if the locking script does not comprise the root hash.

According to a fifth, optional instantiation, there may be provided a method according to any of the first to fourth instantiations, comprising: determining that the condition of the contract linked to the second party has been met; and in response, transmitting an authentication path to the second party, wherein the authentication path comprises a set of hashes, wherein the set of hashes comprises the hash key and one or more sets of internal hashes, each set of internal hashes belonging to a different internal layer of the hash tree.

According to a sixth, optional instantiation, there may be provided a method according to any of the first to fifth instantiations, wherein the second set of leaf hashes comprises a plurality of different hash keys, each generated based on the secret value.

According to a seventh, optional instantiation, there may be provided a method according any of the sixth instantiation, wherein each of the first set of leaf hashes is paired with a different one of the hash keys, and wherein each internal hash of a lowermost internal layer of the hash tree is generated by hashing a concatenation of a different pair of leaf hashes.

According to an eighth, optional instantiation, there may be provided a method according to any of the seventh and fifth instantiations, wherein the authentication path comprises the hash key paired with the leaf hash of the condition linked to the second node.

According to a ninth instantiation of the teachings disclosed herein there is provided computer equipment of the trusted third party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the first to eighth instantiations.

According to a tenth instantiation of the teachings disclosed herein there is provided a computer program embodied on computer-readable storage and configured so as, when run on computer equipment of the trusted third party, to carry out the teachings in accordance with any of the first to eighth instantiations.

According to an eleventh instantiation of the teachings disclosed herein there is provided a computer-implemented method of generating a digital contract between a first party of a blockchain network and a second party of the blockchain network, the digital contract being for transferring an amount of a digital asset from the first party to the second node based on a condition of the contract being fulfilled; the method being performed by the first party and comprising: obtaining a root hash of a hash tree generated by a trusted third party, the hash tree being generated based on i) a plurality of data elements, each data element representing a different condition of the contract, and wherein at least one of the different conditions is linked to the second party, and ii) one or more different hash keys generated based on a secret value known only to the trusted party; and generating a transaction for inclusion in the blockchain, wherein the transaction comprises a locking script for locking the amount of the digital asset to the first party, and wherein the locking script comprises the root hash.

According to a twelfth, optional instantiation, there may be provided a method according to the eleventh instantiation, comprising: transmitting the transaction to one or more nodes of the blockchain network for inclusion in the blockchain.

According to a thirteenth, optional instantiation, there may be provided a method according to the eleventh or twelfth instantiations, wherein said obtaining of the root hash comprises receiving the root hash from the trusted third party.

According to a fourteenth, optional instantiation, there may be provided a method according to the eleventh or thirteenth instantiations, wherein a later transaction of the blockchain generated by the second party comprises an unlocking script comprising i) a data element representing a condition of the contract, and ii) an authentication path comprising a hash key and one or more internal hashes of the hash tree; and wherein the locking script is configured so as to, when executed alongside the unlocking script: generate a candidate root hash by performing a hash tree proof using the data element and the authentication path; and generate a value representing either true or false depending on whether the root hash matches the candidate root hash tree.

According to an fifteenth instantiation of the teachings disclosed herein there is provided a computer equipment of the first party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the eleventh to fourteenth instantiations.

According to a sixteenth instantiation of the teachings disclosed herein there is provided a computer program embodied on computer-readable storage and configured so as, when run on computer equipment of the first party, to carry out the teachings in accordance with any of the eleventh to fourteenth instantiations.

According to a seventeenth instantiation of the teachings disclosed herein there is provided a computer-implemented method of executing a digital contract between a first party of a blockchain network and a second party of the blockchain network, the digital contract being for transferring an amount of a digital asset from the first party to the second party based on a condition of the contract being fulfilled; the method being performed by the second party and comprising: obtaining a data element representing a condition of the contract, the condition being linked to the second party; obtaining an authentication path, the authentication path for generating a candidate root hash of a hash tree that has been generated by the trusted third party, and wherein the authentication path comprises a set of hashes, wherein the set of hashes comprises a hash key generated based on a secret value known only to the trusted third party, and one or more sets of internal hashes, each set of internal hashes belonging to a different internal layer of the hash tree; and generating a transaction for inclusion in the blockchain, wherein the transaction comprises an unlocking script for unlocking the amount of the digital asset from the first party, and wherein the unlocking script comprises the obtained data element and the obtained authentication path.

According to an eighteenth, optional instantiation, there may be provided a method according to the seventeenth instantiation, comprising: transmitting the transaction to one or more nodes of the blockchain network for inclusion in the blockchain.

According to a nineteenth instantiation of the teachings disclosed herein there is provided a computer equipment of the second party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the seventeenth to nineteenth instantiations.

According to a twentieth instantiation of the teachings disclosed herein there is provided a computer program embodied on computer-readable storage and configured so as, when run on computer equipment of the second party, to carry out the teachings in accordance with any of the seventeenth to nineteenth instantiations.

According to a twenty first instantiation of the teachings disclosed herein there is provided a computer-implemented method of encoding a digital contract between a first party of a blockchain network and a second party of the blockchain network, the digital contract being for transferring an amount of a digital asset from the first party to the second party based on a condition of the contract being fulfilled; the method being performed by a trusted third party and comprising: in response to determining that a condition of the contract linked to the second party has been fulfilled, providing the second party with a signature of the trusted third party for inclusion in a transaction of the blockchain, wherein the signature signs a data element representing the fulfilled condition.

According to a twenty second, optional instantiation, there may be provided a method according to the twenty first instantiation, wherein the signature is Rabin signature.

According to a twenty third, optional instantiation, there may be provided a method according to the twenty second instantiation, comprising providing the second party with a Rabin public key.

According to a twenty fourth, optional instantiation, there may be provided a method according to any of the twenty first to twenty third instantiations, wherein said providing of the signature comprises transmitting the signature directly to the second party.

According to a twenty fifth, optional instantiation, there may be provided a method according to any of the twenty first to twenty fourth instantiations, comprising: providing the first party with a plurality of data elements, each data element representing a different condition of the contract, and wherein the plurality of data elements comprises the data element representing the condition linked with the second party.

According to a twenty sixth, optional instantiation, there may be provided a method according to the twenty fifth instantiation, comprising: generating a root hash of a hash tree, wherein the hash tree comprises a layer of leaf hashes, and wherein at least some of said leaf hashes are each generated based on a respective one of the plurality of data elements; and providing the first party with the root hash.

According to a twenty seventh, optional instantiation, there may be provided a method according to the twenty sixth instantiation, comprising: providing the second party with an authentication path for generating a candidate root hash of the hash tree using the data element representing the fulfilled condition.

According to a twenty eighth, optional instantiation, there may be provided a method according to any of the twenty first to twenty sixth instantiation, wherein each data element is a different binary or hexadecimal value representing a different condition of the contract.

According to a twenty ninth instantiation of the teachings disclosed herein there is provided a computer equipment of the trusted third party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the twenty first to twenty eighth instantiations.

According to a thirtieth instantiation of the teachings disclosed herein there is provided a computer program embodied on computer-readable storage and configured so as, when run on computer equipment of the trusted third party, to carry out the teachings in accordance with any of the twenty first to twenty eighth instantiations.

According to a thirty first instantiation of the teachings disclosed herein there is provided a computer-implemented method of generating a digital contract between a first party of a blockchain network and a second party of the blockchain network, the digital contract being for transferring an amount of a digital asset from the first party to the second party based on a condition of the contract being fulfilled; the method being performed by the first party and comprising: obtaining a root hash of a hash tree, wherein the hash tree comprises a layer of leaf hashes, and wherein at least some of said leaf hashes are each generated based on a respective one of a plurality of data elements, each data element representing a different condition of the contract, and wherein at least one of the different conditions is linked to the second party; and generating a transaction for inclusion in the blockchain, wherein the transaction comprises a locking script for locking the amount of the digital asset to the first party, and wherein the locking script comprises the root hash, and wherein the locking script is configured, so as when executed together with an unlocking script of a later transaction, to determine whether the unlocking script comprises: i) a data element representing a condition of the contract that has been signed with a signature of a trusted third party, and ii) an authentication path for generating, using the signed data element, a candidate root hash that matches the obtained root hash.

According to a thirty second, optional instantiation, there may be provided a method according to the thirty first instantiation, wherein obtaining the root hash comprises generating the root hash.

According to a thirty third, optional instantiation, there may be provided a method according to the thirty first instantiation, wherein obtaining the root hash comprises obtaining the root hash from the second party and/or the trusted third party.

According to a thirty fourth, optional instantiation, there may be provided a method according to any of the thirty first to thirty third instantiations, wherein the signature is a Rabin signature.

According to a thirty fifth, optional instantiation, there may be provided a method according to any of the thirty first to thirty fourth instantiations, wherein the authentication path comprises a sequence of hash values, each from a respective layer of the hash tree, and wherein the locking script comprises a sequence of opcodes for performing a hash tree proof using the obtained root hash and the sequence of hash values.

According to a thirty sixth, optional instantiation, there may be provided a method according to any of the thirty first to thirty sixth instantiations, wherein the locking script is configured to allow the first party to redeem the amount of the digital asset if said amount is not transferred to the second party within a predetermined amount of time.

According to a thirty seventh, optional instantiation, there may be provided a method according to any of the thirty first to thirty sixth instantiations, wherein the locking script is configured to determine whether the unlocking script comprises iii) a valid signature and a public key of the second party.

According to a thirty eighth, optional instantiation, there may be provided a method according to any of the thirty first to thirty seventh instantiations, wherein the transaction comprises a first output and a second output, wherein the first output comprises the locking script, and wherein the second output comprises metadata based on the digital contract.

According to a thirty ninth, optional instantiation, there may be provided a method according any of the thirty first to thirty eighth instantiations, comprising, transmitting the transaction to one or more nodes of the blockchain network for inclusion in the blockchain.

According to a fortieth, optional instantiation, there may be provided a method according to the thirty ninth and thirty sixth instantiations, comprising: generating a second transaction for inclusion in the blockchain, wherein the second transaction comprises an unlocking script configured to unlock the locking script, wherein the unlocking script comprises a public key and a signature of the first party.

According to a forty first instantiation of the teachings disclosed herein there is provided a computer equipment of the first party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the thirty first to fortieth instantiations.

According to a forty second instantiation of the teachings disclosed herein there is provided a computer program embodied on computer-readable storage and configured so as, when run on computer equipment of the first party, to carry out the teachings in accordance with any of the thirty first to fortieth instantiations.

According to a forty third instantiation of the teachings disclosed herein there is provided a computer-implemented method of executing a digital contract between a first party of a blockchain network and a second party of the blockchain network, the digital contract being for transferring an amount of a digital asset from the first party to the second party based on a condition of the contract being fulfilled; the method being performed by the second party and comprising: obtaining a data element representing a fulfilled condition of the contract, the condition being linked to the second party; obtaining an authentication path for generating a candidate root hash of a hash tree using the obtained data element, wherein the hash tree comprises a layer of leaf hashes, and wherein at least some of said leaf hashes are each generated based on a respective one of the plurality of data elements, each data element representing a different condition of the contract, and wherein the plurality of data elements comprises the obtained data element; obtaining a signature and a public key of a trusted third party, wherein the signature signs the fulfilled condition; generating a transaction for inclusion in the blockchain, wherein the transaction comprises an unlocking script for unlocking the amount of the digital asset from the first party, and wherein the unlocking script comprises the obtained authentication path, the public key, and the obtained data element signed with the signature.

According to a forty fourth, optional instantiation, there may be provided a method according to the forty third instantiation, wherein the signature is a Rabin signature.

According to a forty fifth, optional instantiation, there may be provided a method according to the forty third or forty fourth instantiations, wherein obtaining the authentication path comprises obtaining the authentication path from the trusted third party.

According to a forty sixth, optional instantiation, there may be provided a method according to the forty third or forty fourth instantiations, wherein obtaining the signature and/or the public key of the trusted third party comprises obtaining the signature and/or the public key directly from the trusted third party.

According to a forty seventh, optional instantiation, there may be provided a method according to any of the forty third to forty sixth instantiations, wherein the authentication path comprises a sequence of hash values, each from a respective layer of the hash tree.

According to a forty eighth, optional instantiation, there may be provided a method according to any of the forty third to forty seventh instantiations, comprising: transmitting the transaction to one or more nodes of the blockchain network for inclusion in the blockchain.

According to a forty ninth instantiation of the teachings disclosed herein there is provided a computer equipment of the second party, comprising: memory comprising one or more memory units; and processing apparatus comprising one or more processing units, wherein the memory stores code arranged to run on the processing apparatus, the code being configured so as when on the processing apparatus to carry out the teachings in accordance with any of the forty third to forty eighth instantiations.

According to a fiftieth instantiation of the teachings disclosed herein there is provided a computer program embodied on computer-readable storage and configured so as, when run on computer equipment of the second party, to carry out the teachings in accordance with any of the forty third to forty eighth instantiations.

According to a fifty first instantiation of the teachings disclosed herein there is provided a computer-readable storage medium comprising a transaction for implementing a digital contract between a first party of a blockchain network and a second party of the blockchain network, the digital contract being for transferring an amount of a digital asset from the first party to the second node based on a condition of the contract being fulfilled, wherein the transaction comprises a locking script for locking the amount of the digital asset to the first party, wherein the locking script comprises a root hash, and wherein the root hash of a hash tree generated by a trusted third party, the hash tree being generated based on i) a plurality of data elements, each data element representing a different condition of the contract, and wherein at least one of the different conditions is linked to the second party, and ii) one or more different hash keys generated based on a secret value known only to the trusted party.

According to another instantiation of the teachings disclosed herein, there may be provided a method comprising the actions of the first party, the second party, any the trusted third party.

According to another instantiation of the teachings disclosed herein, there may be provided a system comprising the computer equipment of the first party, the second party, any the trusted third party.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of encoding a digital contract between a first party of a blockchain network and a second party of the blockchain network, the digital contract being for transferring an amount of a digital asset from the first party to the second party based on a condition of the contract being fulfilled; the method being performed by a trusted third party and comprising:

obtaining a plurality of data elements, each data element representing a different condition of the contract, and wherein at least one of the different conditions is linked to the second party;

generating a hash tree based on the plurality of data elements, wherein the hash tree comprises:

i) a leaf layer comprising a first set of leaf hashes each generated by hashing a respective data element but not a secret value known only to the trusted third party, and a second set of leaf hashes comprising at least one hash key generated by hashing a secret value known only to the trusted third party but not any of the respective data elements; and ii) one or more internal layers each comprising a respective set of internal hashes, wherein each internal hash of a respective internal layer is generated by hashing a concatenation of at least two hashes from a lower layer; and iii) a root layer comprising a root hash, the root hash generated by hashing a concatenation of at least two hashes from an uppermost internal layer;

making the root hash available to the first party for inclusion in a transaction of a blockchain;

determining that the condition of the contract linked to the second party has been met; and in response, transmitting an authentication path to the second party, wherein the authentication path comprises a set of hashes, wherein the set of hashes comprises the hash key and one or more sets of internal hashes, each set of internal hashes belonging to a different internal layer of the hash tree.

2. The method of claim 1, wherein said obtaining of the data elements comprises receiving the data elements from the first and/or second parties.

3. The method of claim 1, wherein said making available of the root hash comprises transmitting the root hash to the first party.

4. The method of claim 1, comprising:

identifying a transaction of the blockchain generated by the first party, wherein the transaction comprises the digital contract, and wherein the digital contract comprises a locking script locking the amount of the digital asset to the first party;

determining whether the locking script comprises the root hash; and notifying the second party if the locking script does not comprise the root hash.

5. The method of claim 1, wherein the second set of leaf hashes comprises a plurality of different hash keys, each generated based on the secret value.

6. The method of claim 5, wherein each of the first set of leaf hashes is paired with a different one of the hash keys, and wherein each internal hash of a lowermost internal layer of the hash tree is generated by hashing a concatenation of a different pair of leaf hashes.

7. The method of claim 6, wherein the authentication path comprises the hash key paired with the leaf hash of the condition linked to the second party.

8. Computer equipment of a trusted third party, comprising:

memory comprising one or more memory units; and processing apparatus comprising one or more processing units, wherein the memory stores code arranged to run on the processing apparatus, the code being configured so as when executed on the processing apparatus the processing apparatus performs a method of encoding a digital contract between a first party of a blockchain network and a second party of the blockchain network, the digital contract being for transferring an amount of a digital asset from the first party to the second party based on a condition of the contract being fulfilled; the method being performed by the computer equipment of the trusted third party and comprising:

obtaining a plurality of data elements, each data element representing a different condition of the contract, and wherein at least one of the different conditions is linked to the second party;

generating a hash tree based on the plurality of data elements, wherein the hash tree comprises:

i) a leaf layer comprising a first set of leaf hashes each generated by hashing a respective data element but not a secret value known only to the trusted third party, and a second set of leaf hashes comprising at least one hash key generated by hashing a secret value known only to the trusted third party but not any of the respective data elements; and ii) one or more internal layers each comprising a respective set of internal hashes, wherein each internal hash of a respective internal layer is generated by hashing a concatenation of at least two hashes from a lower layer; and iii) a root layer comprising a root hash, the root hash generated by hashing a concatenation of at least two hashes from an uppermost internal layer;

making the root hash available to the first party for inclusion in a transaction of a blockchain;

determining that the condition of the contract linked to the second party has been met; and in response, transmitting an authentication path to the second party, wherein the authentication path comprises a set of hashes, wherein the set of hashes comprises the hash key and one or more sets of internal hashes, each set of internal hashes belonging to a different internal layer of the hash tree.

9. A computer program embodied on a non-transitory computer-readable storage medium and configured so as when run on computer equipment of a trusted third party, the computer equipment performs a method of encoding a digital contract between a first party of a blockchain network and a second party of the blockchain network, the digital contract being for transferring an amount of a digital asset from the first party to the second party based on a condition of the contract being fulfilled; the method being performed by the computer equipment of the trusted third party and comprising:

obtaining a plurality of data elements, each data element representing a different condition of the contract, and wherein at least one of the different conditions is linked to the second party;

generating a hash tree based on the plurality of data elements, wherein the hash tree comprises:

i) a leaf layer comprising a first set of leaf hashes each generated by hashing a respective data element but not a secret value known only to the trusted third party, and a second set of leaf hashes comprising at least one hash key generated by hashing a secret value known only to the trusted third party but not any of the respective data elements; and ii) one or more internal layers each comprising a respective set of internal hashes, wherein each internal hash of a respective internal layer is generated by hashing a concatenation of at least two hashes from a lower layer; and iii) a root layer comprising a root hash, the root hash generated by hashing a concatenation of at least two hashes from an uppermost internal layer;

making the root hash available to the first party for inclusion in a transaction of a blockchain;

determining that the condition of the contract linked to the second party has been met; and in response, transmitting an authentication path to the second party, wherein the authentication path comprises a set of hashes, wherein the set of hashes comprises the hash key and one or more sets of internal hashes, each set of internal hashes belonging to a different internal layer of the hash tree.

10. A computer program embodied on a non-transitory computer-readable storage medium and configured so as when run on computer equipment the computer equipment performs a method of generating a digital contract between a first party of a blockchain network and a second party of the blockchain network, the digital contract being for transferring an amount of a digital asset from the first party to the second party based on a condition of the contract being fulfilled; the method being performed by the first party and comprising:

obtaining a root hash of a hash tree generated by a trusted third party, the hash tree being generated based on i) a plurality of data elements, each data element representing a different condition of the contract, and wherein at least one of the different conditions is linked to the second party, and ii) one or more different hash keys generated based on a secret value known only to the trusted party, the hash tree comprising a leaf layer comprising a first set of leaf hashes each generated by hashing a respective data element but not a secret value known only to the trusted third party, and a second set of leaf hashes comprising at least one hash key generated by hashing a secret value known only to the trusted third party but not any of the respective data elements; and generating a transaction for inclusion in the blockchain, wherein the transaction comprises a locking script for locking the amount of the digital asset to the first party, and wherein the locking script comprises the root hash;

wherein the locking script is configured so as to, when executed alongside an unlocking script comprised in a later transaction of the blockchain generated by the second party, the unlocking script comprising i) a data element representing a condition of the contract, and ii) an authentication path comprising a hash key and one or more internal hashes of the hash tree:

generate a candidate root hash by performing a hash tree proof using the data element and the authentication path; and generate a value representing either true or false depending on whether the root hash matches the candidate root hash tree.

11. The computer program of claim 10, wherein the method comprises:

transmitting the transaction to one or more nodes of the blockchain network for inclusion in the blockchain.

12. The computer program of claim 10, wherein said obtaining of the root hash comprises receiving the root hash from the trusted third party.

* * * * *